US007433416B1

(12) United States Patent
Banister

(10) Patent No.: US 7,433,416 B1
(45) Date of Patent: Oct. 7, 2008

(54) METHOD AND APPARATUS FOR GENERATING TRANSMIT ADAPTIVE ANTENNA WEIGHTS WITH NULLING USING BINARY GRADIENT FEEDBACK

(75) Inventor: Brian C. Banister, San Diego, CA (US)

(73) Assignee: VIA Telecom Co., Ltd., San Diego, CA (US)

( * ) Notice: Subject to any disclaimer, the term of this patent is extended or adjusted under 35 U.S.C. 154(b) by 801 days.

(21) Appl. No.: 10/080,751

(22) Filed: Feb. 22, 2002

Related U.S. Application Data

(63) Continuation-in-part of application No. 09/632,081, filed on Aug. 2, 2000, now Pat. No. 6,952,455.

(60) Provisional application No. 60/278,501, filed on Mar. 23, 2001.

(51) Int. Cl.
*H04B 1/02* (2006.01)
(52) U.S. Cl. ...................... 375/267
(58) Field of Classification Search ............ 375/267, 375/295, 299, 259, 260, 316
See application file for complete search history.

(56) References Cited

U.S. PATENT DOCUMENTS

| | | | | |
|---|---|---|---|---|
| 5,491,837 | A * | 2/1996 | Haartsen | 455/62 |
| 5,781,845 | A * | 7/1998 | Dybdal et al. | 455/65 |
| 6,031,866 | A | 2/2000 | Oler et al. | |
| 6,141,567 | A | 10/2000 | Youssefmir et al. | |
| 6,144,711 | A * | 11/2000 | Raleigh et al. | 375/347 |
| 6,434,366 | B1 * | 8/2002 | Harrison et al. | 455/69 |
| 6,473,467 | B1 | 10/2002 | Wallace et al. | |
| 6,804,312 | B1 | 10/2004 | Win et al. | |
| 6,888,809 | B1 * | 5/2005 | Foschini et al. | 370/334 |
| 6,952,455 | B1 * | 10/2005 | Banister | 375/267 |
| 7,236,538 | B1 | 6/2007 | Banister | |

OTHER PUBLICATIONS

Liang, et al., "Transmit Antenna Array Techniques for Cellular CDMA Systems", IEEE, published Sep. 1998, pp. 1396-1400.

Liang, et al., "Forward Link Antenna Diversity Using Feedback for Indoor Communication Systems", IEEE, published May 1995, pp. 1753-1755.

Gerlach, et al., "Base Station Transmitting Antenna Arrays for Multipath Environments", Signal Processing, vol. 54, No. 1, published by Elsevier, Oct. 1996, pp. 59-73.

(Continued)

*Primary Examiner*—Kevin M Burd
(74) *Attorney, Agent, or Firm*—Jaquez & Associates; Martin J. Jaquez, Esq.

(57) ABSTRACT

A novel method and apparatus for generating transmit adaptive antenna weights with nulling using binary gradient feedback is disclosed. The method and apparatus of the present invention allows a communication system to provide adequate power to a desired receiver and reduce interference to proximate receivers. The method and apparatus of the present invention generates transmit adaptive antenna weights that direct (or "steer") nulling to proximate receivers, and thus reduce interference to these proximate receivers. The generating transmit adaptive antenna weights method and apparatus utilizes a feedback algorithm that tracks a normalized weight vector toward a maximum of an inverse cost function. The method and apparatus of the present invention improves the performance and capacity of a CDMA system. Specifically, the present inventive method and apparatus decreases the overall interference in a communication system.

48 Claims, 10 Drawing Sheets

OTHER PUBLICATIONS

Rashid-Farrokhi, et al., "Transmit Beamforming and Power Control for Cellular Wireless Systems", IEEE Journal on Selected Areas in Communications, vol. 16, No. 8, Oct. 1998, pp. 1437-1450.

Heath, et al., "A Simple Scheme for Transmit Diversity Using Partial Channel Feedback", Information Systems Laboratory, IEEE, 1998, pp. 1073-1078.

Harrison, et al. (Motorola) "Open and Closed Loop Transmit Diversity at High Data Rates on 2 and 4 Elements", document #C30-199990817-017, submitted to 3GPP2 Aug. 16-20, 1999, pp. 1-5.

Burd, Kevin, Office Action from USPTO dated Mar. 15, 2004 for U.S. Appl. No. 09/632,081, 7 pgs.

Banister, Brian, Response to Office Action dated Jun. 14, 2004 for U.S. Appl. No. 09/632,081, 25 pgs.

Burd, Kevin, Office Action from USPTO dated Sep. 7, 2004 for U.S. Appl. No. 09/632,081, 7 pgs.

Banister, Brian, Response to Office Action dated Nov. 8, 2004 for U.S. Appl. No. 09/632,081, 17 pgs.

Burd, Kevin, Office Action from USPTO dated Nov. 30, 2004 for U.S. Appl. No. 09/632,081, 3 pgs.

Burd, Brian, Notice of Allowance from USPTO dated Feb. 16, 2005 for U.S. Appl. No. 09/632,081, 6 pgs.

Ghulamali, Qutbuddin, Office Action from USPTO dated Jun. 8, 2005 for U.S. Appl. No. 10/076,925, 9 pgs.

Banister, Brian, Amendment dated Sep. 8, 2005 for U.S. Appl. No. 10/076,925, 14 pgs.

Ghulamali, Qutbuddin, Office Action from USPTO dated Nov. 28, 2005 for U.S. Appl. No. 10/076,925, 8 pgs.

Banister, Brian, Amendment After Final dated Feb. 27, 2006 for U.S. Appl. No. 10/076,925, 12 pgs.

Banister, Brian, Supplemental Amendment After Final Action, submitted to PTO for U.S. Appl. No. 10/076,925 via email dated Apr. 3, 2006, 9 pgs.

Ghulamali, Qutbuddin, Office Action from the USPTO dated Apr. 17, 2006 for U.S. Appl. No. 10/076,925, 15 pgs.

Banister, Brian, Amendment After Non-Final Action dated Jul. 17, 2006 for U.S. Appl. No. 10/076,925, 15 pgs.

Banister, Brian, Proposed Examiner's Amendment dated Aug. 3, 2006 for U.S. Appl. No. 10/076,925, 8 pgs.

Ghulamali, Qutbuddin, Notice of Allowance from USPTO dated Sep. 27, 2006 for U.S. Appl. No. 10/076,925, 9 pgs.

Banister, Brian, Comments on Examiner's Statement of Reasons for Allowance dated Dec. 26, 2006 for U.S. Appl. No. 10/076,925, 4 pgs.

Burd, Kevin, Office Action from the USPTO dated Sep. 14, 2005 for U.S. Appl. No. 10/080,728, 10 pgs.

Banister, Brian, Amendment filed in USPTO dated Feb. 14, 2006 for U.S. Appl. No. 10/080,728, 22 pgs.

Burd, Devin, Office Action from the USPTO dated May 1, 2006 for U.S. Appl. No. 10/080,728, 10 pgs.

Banister, Brian, Amendment filed in the USPTO dated Sep. 1, 2006 for U.S. Appl. No. 10/080,728, 23 pgs.

Burd, Kevin, Office Action received from USPTO dated Nov. 24, 2006 for U.S. Appl. No. 10/080,728, 10 pgs.

Banister, Brian, Amendment After Final Office Action filed in USPTO on Jan. 24, 2007 for U.S. Appl. No. 10/080,728, 19 pgs.

Burd, Kevin, Notice of Allowance received from the USPTO dated Feb. 8, 2007 for U.S. Appl. No. 10/080,728, 8 pgs.

Banister, et al., "Tracking Performance of a Stochastic Gradient Algorithm for Transmit Antenna Weight Adaptation with Feedback," May 2001, pp. 2965-2968, IEEE.

Banister, et al, "A Stochastic Gradient Algorithm for Transmit Antenna Weight Adaptation with Feedback," 2001, pp. 314-317, IEEE.

Gerlach, "Adaptive Transmitting Antenna Arrays with Feedback," 1994, pp. 150-152, IEEE.

Liang, "Forward Link Antenna Diversity Using Feedback for Indoor Communication Systems," Sep. 1995, pp. 1396-1400, IEEE.

Gerlach, "Adapative Transmitting Antenna Methods for Multipath Environments," 1994, pp. 425-429, vol. 1, IEEE Globecom.

Derryberry, et al., "Transmit Adaptive Arrays without User Specific Pilot," 3GPP2-C30-19990817-030, 1999, pp. 1-4, Aug. 16-20, Portland, Oregon.

Harrison, "TX AA Parameter Recommendations," 3GPP2-C30-19990914-010, Sep. 14, 1999, pp. 1-3, Tokyo, Japan.

Pedersen, et al., "A Stochastic Model of the Temporal and Azimuthal Dispersion Seen at the Base Station in Outdoor Propagation Environments," Mar. 2000, pp. 437-447, vol. 49, No. 2, IEEE Transactions on Vehicular Technology.

* cited by examiner

METHOD AND APPARATUS FOR GENERATING TRANSMIT ADAPTIVE ANTENNA WEIGHTS WITH NULLING USING BINARY GRADIENT FEEDBACK

CROSS-REFERENCE TO RELATED APPLICATIONS

This application claims benefit under 35 USC § 120 as a continuation-in-part of U.S. application Ser. No. 09/632,081, filed Aug. 2, 2000, entitled "Adaptive Antenna Method and Apparatus", now U.S. Pat. No. 6,952,455 issued Oct. 4, 2005, and claims the benefit under 35 USC § 119 of U.S. Provisional Application No. 60/278,501, filed Mar. 23, 2001, entitled "Adaptive Antenna System and Method", and the contents of both applications are hereby incorporated by reference in their entireties.

BACKGROUND OF THE INVENTION

1. Field of the Invention

This invention relates to digital wireless communication systems, and more particularly to methods for generating transmit adaptive antenna weights with nulling using binary gradient feedback.

2. Description of Related Art

Digital wireless systems presently being deployed are commonly seen to be forward link (i.e., base station ("BS")-to-mobile station ("MS")) capacity limited. This is mostly due to asymmetric traffic scenarios: most data applications, such as web browsing, are envisioned to be sending relatively large quantities of data to the mobile user on the forward link, while the reverse link may contain only small control packets (e.g., a new IP address to download) so that the forward data rate is much greater than the reverse data rate.

Forward capacity can be increased with an array of antennae in a base station whose individual carrier amplitudes and phases can be adjusted based on feedback from a MS. In particular, a transmit adaptive antenna (TxAA) algorithm will typically transmit the same MS-specific waveform on multiple antennae, applying an adaptive magnitude and phase to the sinusoidal carrier of each antenna, wherein the adaptive magnitude and phase is modeled as a complex baseband weight. To allow the MS to perform coherent demodulation, a dedicated pilot channel is typically transmitted in the same manner as the data.

While receive adaptive antenna (RxAA) algorithms at the BS are fairly straight forward, TxAA algorithms are not. The mere definition of an "optimal" TxAA algorithm is not unambiguous as the optimization of one mobile's forward link can degrade another's, leading to complex tradeoffs which are not part of the RxAA problem.

Most TxAA algorithms will require some a priori knowledge of the transmission channel from the BS to the MS. Given this knowledge and a defined "optimality" criterion, the BS can determine the TxAA weights. The difficulty is that, although the MS can measure the channel, it is the BS which needs the measured information to adjust its transmit weights. Also, there can be some additional complexity in that the MS must generally measure the channel of each transmit antenna separately, in addition to measuring the channel of the overall transmit (Tx) weight-adjusted signal. The latter measurement is required for the demodulation of the signal.

A number of methods for implementing TxAA algorithms have been proposed. According to some of these proposals, a few bits are allocated to the MS to encode the channel gain and phase. See, for example, Thomas Derryberry, Balaji Raghothaman (Nokia) "Transmit Adaptive Arrays without User Specific Pilot", document # C30-19990817-030, submitted to 3GPP2 Aug. 1999; Mark Harrison (Motorola) "Tx AA Parameter Recommendations", document #C30-19990914-010, submitted to 3GPP2, Tokyo Japan, September 1999; and Mark Harrison, Kiran Kuchi (Motorola) "Open and closed loop transmit diversity at high data rates on 2 and 4 elements", document #C30-19990817-17, submitted to 3GPP2 Aug. 1999. These methods do not allow the desired antenna weights to be precisely determined because the channel state must be distorted in order to be fed back to the BS with a low bit rate.

Typically, the academic literature has assumed that the full channel information is available at the transmitter, which is not a practical assumption. See, e.g., Jen-Wei Liang, Arogyaswami Paulraj "Forward link antenna diversity using feedback for indoor communication systems" Proceedings, 1995 International Conference on Acoustics, Speech, and Signal Processing, May 1995; Farrokh Rashid-Farrokhi, K. J. Ray Liu, Leandros Tassiulas "Transmit beamforming and power control for cellular wireless systems" IEEE Journal on Selected Areas in Communications, Vol. 16, No. 8, Oct. 1998. There have been several submissions to the TIA standardization body for TxAA algorithms with channel feedback from MS to BS, some of which are referenced above. All of these submissions require that the MS measures a primary and secondary pilot transmitted from the primary and secondary antennae. Some submissions have shown that 4 antenna transmission can yield improved performance, however, with no recognition of the increased complexity at the MS.

The use of a few bits of channel feedback leads to substantial degradation relative to possible performance, because the feedback requires low bit rate quantization. Also, the MS must individually measure and transmit information for each antenna; the MS requires extra hardware to perform these functions. Furthermore, the above-described methods do not gracefully grow to accommodate an increase in the number of antennae.

The above-mentioned systems are illustrated in FIGS. 1-3, which illustrate a CDMA system. FIG. 1 shows a transmitter 10 with two antennae, a first antenna (antenna #0) 12 and a second antenna 14 (antenna #1). As is shown, different common pilot signals are associated with different antennae. For each user, such as user #0 and user #1, the transmitter 10 includes an adder, e.g., the adders, 16 and 18 respectively, that adds together a dedicated pilot signal for the user and the forward traffic for that user. For user #0, multipliers 20 and 22 multiply the summed signal with complex weights for the first and second antennae 12 and 14, respectively. For each antenna, the weighted user signals are summed by adders 24 and 26 and the result is added by adders 28 and 30 to the pilot signal for that antenna. It should be noted that FIG. 1 represents a complex baseband equivalent, as no RF modulation stage is shown.

FIGS. 2 and 3 show possible embodiments for receivers that may be used to receive signals transmitted by the transmitter 10. As shown in FIG. 2, a received signal is divided into three components: one signal corresponding to the dedicated channel, one signal corresponding to the common pilot for the first antenna and one signal corresponding to the common pilot for the second antenna. This division is accomplished by multipliers 32, 34 and 36 and accumulators 38, 40 and 42. A more hardware efficient embodiment is shown in FIG. 3, which employs multiplexer 44 and demultiplexer 46 to alternately select between the signals for the different transmit antennae. The time-multiplexed processing used by the embodiment of FIG. 3 saves hardware at the expense of 3 dB loss of precision for each channel. This tradeoff may be acceptable in some systems where a low bit rate, low precision channel reporting is used by the mobile to report these channel estimates to the BS.

The channel estimate attained by the mobile is coded into a low bit representation. The bit rates mentioned in the above cited references are 1, 2 or 4 bits (1b phase, 2b phase, or 3b phase+1b amplitude). So, for a forward channel vector c, the mobile generates the estimate ĉ, which is then quantized to produce the feedback estimate ĉ̂.

Note that the MS channel estimation hardware of FIGS. 2 and 3 can be used for an arbitrarily large number of Tx antennae, provided that there are unique pilot codes for each antenna and that the MS has information regarding these codes.

Finally, the proposed systems have the MS report the channel estimate based on 1 "path". In the presence of resolvable multi-path due to delayed reflections of the transmitted waveform, particularly for CDMA, there may be more than one path that is usable to the MS. In order to report the channel for N such paths, the MS-to-BS feedback rate would be required to increase N-fold, and the number of such paths would somehow need to be communicated to the BS. This solution is not practical however, and instead, the MS reports the channel estimate for only the strongest path. This solution discards some useful channel characteristics which could further increase performance under these circumstances.

The algorithm employed by the BS to utilize the received channel information would most likely be a simple matched transmission weighting. That is, the forward weights chosen would be the conjugate of the forward vector channel, so that the weights are determined as follows:

w=c.

This formulation attempts to maximize signal power to the mobile without regard to the locations of other mobiles. It does not steer nulls to the other mobiles. The channel estimate from a given mobile could be used to determine transmission nulls of other mobiles, but the coarseness of the channel estimate (no greater than 4 bits) makes this approach ineffective.

Schemes such as that shown in FIGS. 1-3 have significant disadvantages. In particular, as previously mentioned, the use of a few bits of channel feedback requires quantization, which leads to substantial degradation relative to the possible performance. Also, because an MS unit must individually measure and transmit information for each antenna, the MS requires extra hardware to perform these functions. Furthermore, the above-described methods do not grow gracefully to applications having more antennae.

One method used by the present invention in implementing a TxAA algorithm (referred to as the "Adaptive Antenna Method and Apparatus") that overcomes these disadvantages is described in the above-incorporated U.S. Provisional Application No. 60/278,501, U.S. application Ser. No. 09/632,081 and hereinbelow. In accordance with this method, a transmitter includes hardware and/or software for adaptively updating weights for a plurality of antennae. In particular, according to the present invention, the transmitter transmits a probing signal which the receiver measures, from which the receiver generates feedback which assists the transmitter in adapting the multiple antenna transmission weights. The probing signal is generated as a pair of test weight vectors applied to the pilot, each vector comprising a plurality of complex entries, with each entry corresponding to a different one of a plurality of antennae. The first complex weight vector is equal to $$\frac{w_{base} + \beta \cdot v}{\|w_{base} + \beta \cdot v\|}$$

and the second complex weight vector is equal to $$\frac{w_{base} - \beta \cdot v}{\|w_{base} - \beta \cdot v\|},$$

where v is a test perturbation vector comprising a plurality of complex entries, with each entry corresponding to a different one of a plurality of antennae, $\beta$ is an algorithm constant and $w_{base}$ is a vector that is updated based on feedback received from a receiver. The first and second complex weight vectors are applied to a dedicated pilot signal during alternate time intervals. During each time interval, the average of the first and second complex weight vectors is applied to the data traffic transmitted by the transmitter.

A receiver (e.g., a mobile station or ("MS")) alternately receives the pilot signal as multiplied by the first and second weight vectors as described above. The mobile station determines which of the weighted pilot signals resulted in a stronger signal received at the mobile and, based upon this determination, transmits feedback information. The transmitter receives the feedback and updates the first and second weights accordingly. In particular, if the first weight resulted in a stronger signal, $w_{base}$ is updated to become $$\frac{w_{base} + \beta \cdot v}{\|w_{base} + \beta \cdot v\|}$$

(the previous first weight) whereas if the second weight resulted in a stronger signal, $w_{base}$ is updated to become $$\frac{w_{base} - \beta \cdot v}{\|w_{base} - \beta \cdot v\|}$$

(the previous second weight). The above-described process is repeated with the new $w_{base}$. New test vectors v are generated and applied after each MS channel measurement is made.

A disadvantage of the adaptive antenna method and apparatus and the other TxAA techniques described above with reference to FIGS. 1-3 is that these techniques only partially decrease interference to proximate receivers (e.g., mobile stations that are within signal range of a base station) because interference can be further decreased if nulls are steered to these proximate receivers. A proximate receiver is defined as any receiver that is within signal range of a transmitter and is not a receiver for which the transmitter signal is intended. Reducing interference to proximate receivers results in system gains such as increased capacity. Thus, a need exists for a method and apparatus for reducing interference caused by transmit adaptive antenna techniques. Such a method and apparatus should utilize nulling techniques that reduce interference to proximate receivers.

The present invention provides such a method and apparatus for generating transmit adaptive antenna weights with nulling using binary gradient feedback.

SUMMARY OF THE INVENTION

The present invention is a novel method and apparatus for generating transmit adaptive antenna weights with nulling using binary gradient feedback. The method and apparatus of the present invention allows a communication system to provide adequate power to a desired receiver and reduce interference to proximate receivers within signal reception range of a transmitter. The method and apparatus of the present invention generates transmit adaptive antenna weights that direct (or "steer") nulling to proximate receivers, and thereby reduce interference to the proximate receivers. The generating transmit adaptive antenna weights method and apparatus utilizes a feedback algorithm that tracks a normalized weight vector toward a maximum of an inverse cost function.

The method and apparatus of the present invention improves the performance and capacity of a CDMA or other wireless system. Specifically, the present inventive method and apparatus decreases the overall interference in a communication system by decreasing interference to proximate receivers, caused by adaptive antenna techniques.

The details of the embodiments of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings indicate like elements.

DETAILED DESCRIPTION OF THE INVENTION

Figure 1:
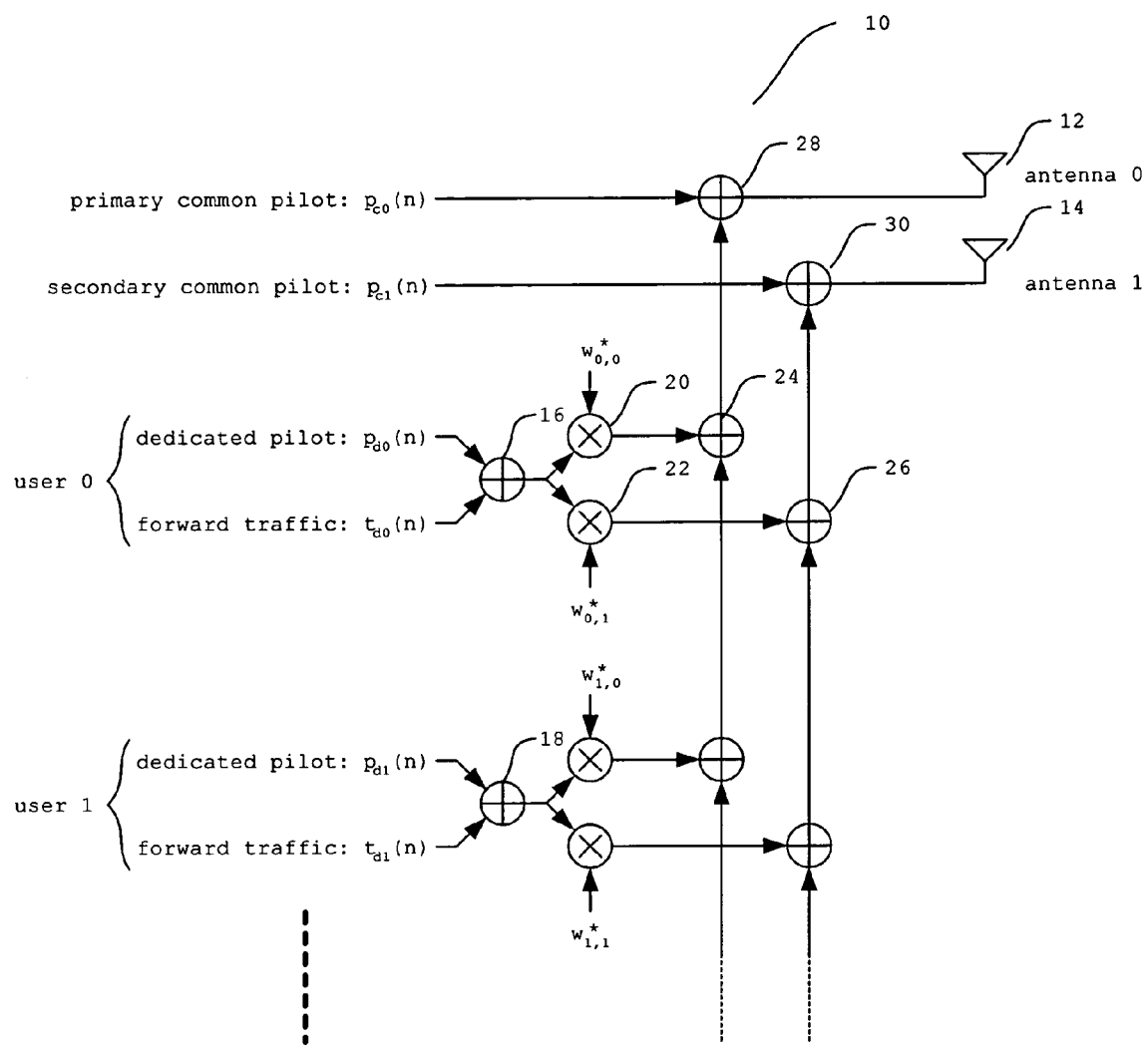
FIG. 1 is a simplified block diagram of one type of conventional two-antenna transmitter that employs antenna weighting derived from receiver feedback
Figure 2:
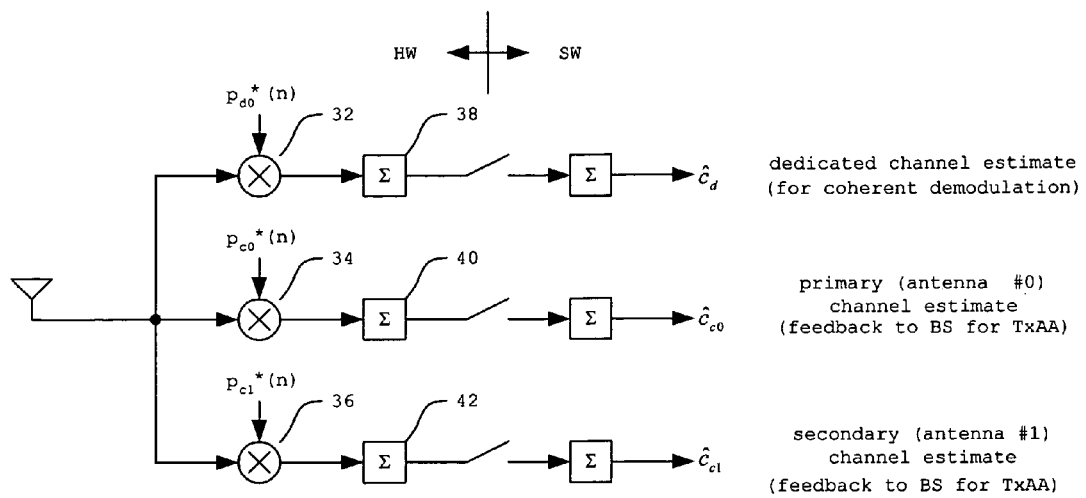
FIG. 2 is a simplified block diagram of a first type of conventional receiver that estimates the channel for each transmit antenna individually.
Figure 3:
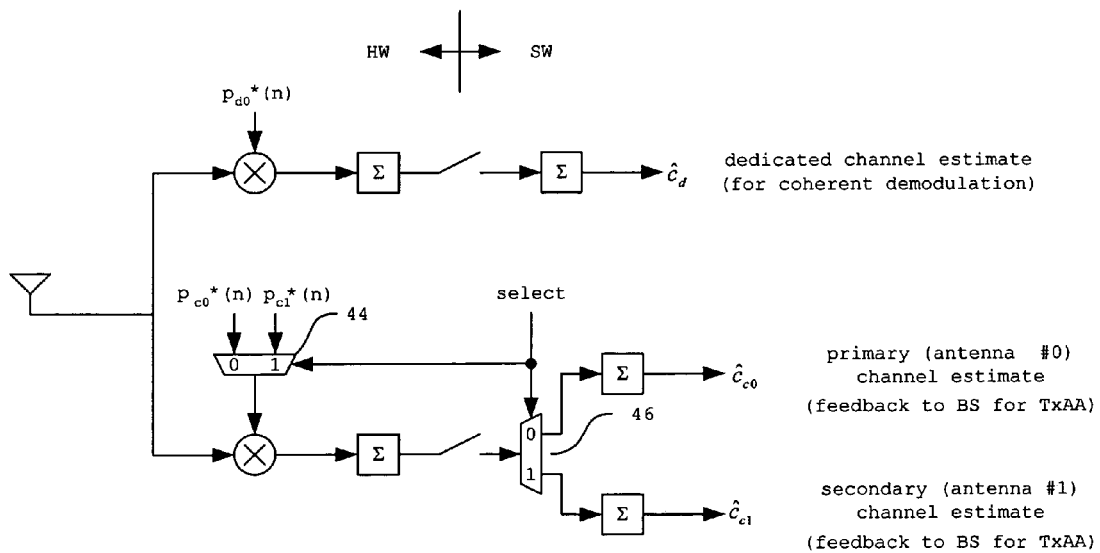
FIG. 3 is a simplified block diagram of a second type of conventional receiver that estimates the channel for each transmit antenna individually.

Throughout this description, the preferred embodiment and examples shown should be considered as exemplars, rather than as limitations on the present invention.

The method and apparatus of the present invention aids in reducing interference in a wireless communication system. The present invention decreases interference to proximate receivers within signal reception range of a transmitter using transmit adaptive antenna techniques. Specifically, the present invention is a method and apparatus for generating transmit adaptive antenna weights with nulling using binary gradient feedback. The present invention is used to maximize an inverse cost function that allows a communication system to provide adequate power to a desired receiver and reduce interference to proximate receivers. The method and apparatus of the present invention generates transmit adaptive antenna weights that direct (or "steer") nulling to proximate receivers thereby reducing interference to the proximate receivers. The generating transmit adaptive antenna weights method and apparatus utilizes a feedback algorithm that tracks a normalized weight vector toward a maximum of an inverse cost function.

The present inventive method and apparatus is primarily intended for use in digital wireless communication systems. An exemplary DS-CDMA communication system adapted for use in the present generating transmit adaptive antenna weights with nulling using binary gradient feedback method and apparatus is described. However, as those of ordinary skill in the art shall recognize, any convenient wireless communication system can be used to practice the present invention. The communication system should allow the mobile station the capability of measuring radio frequency signal strengths and providing binary feedback to the base station. The present invention can be used in any wireless communication system where decreasing interference is desirable.

The following table defines some terms used throughout this description of the invention.

Nomenclature:

Vector and matrix variables are denoted in bold, in contrast to scalars, which are not in bold.

Superscript "T" represents matrix or vector transposition.

Superscript "H" represents matrix or vector hermitian transpose (or conjugate transpose)

| Term | Definition of Term |
| --- | --- |
| AA | Adaptive antenna, more generally adaptive antenna algorithm. |
| BS | Base Station, fixed station which communicates with multiple mobile stations and provides their gateway to the fixed network. |
| CDMA | Code Division Multiple Access. |
| DS-CDMA | Direct Sequence CDMA. |
| Forward link | Radio link from the transmitting base station to the receiving mobile station. |
| HW | Hardware, referring to the fixed digital logic portion of a modem (as opposed to SW). |
| MS | Mobile Station, a user of the cellular network, e.g. a cell phone or a wireless data terminal. |
| pilot | A known signal or "training sequence" transmitted so that the receiver may use it to estimate the channel response. |
| QOS | quality of service |
| reverse link | Radio link from the transmitting mobile station to the receiving base station. |
| Rx | Receive. |
| SW | Software, typically to distinguish the (modifiable) SW portion of a modem from the HW. |
| Tx | Transmit. |

Transmit Adaptive Antenna Weighting Embodiment

For clarity purposes, certain non-essential assumptions are made in the present detailed description. First, the wireless communication system described is assumed to be a DS- CDMA (Direct Sequence, Code Division Multiple Access) system that uses "pilots" (or "pilot channels") for use in performing coherent demodulation. In fact, most modern digital wireless systems include a pilot channel (sometimes known as a "training sequence", when the pilot channel is time multiplexed, rather than code multiplexed) which is used for channel estimation. Any such system can be used in practicing the present invention.

Second, the below described adaptive array transmitter is considered to exist in a base station and the receiver is a mobile station. This applies to cellular communication applications. In one embodiment, the mobile station may also have a transmit array operating in the same manner. Alternatively, the system that uses the present inventive method and apparatus may not be a cellular system, but rather, it may be a peer-to-peer communication system such as those defined by the Bluetooth™ Specification.

The invention as described can be applied without regard to how many antennae the transmitting BS is using, and in particular the MS does not need knowledge of the number of antennae being used.

Figure 4:
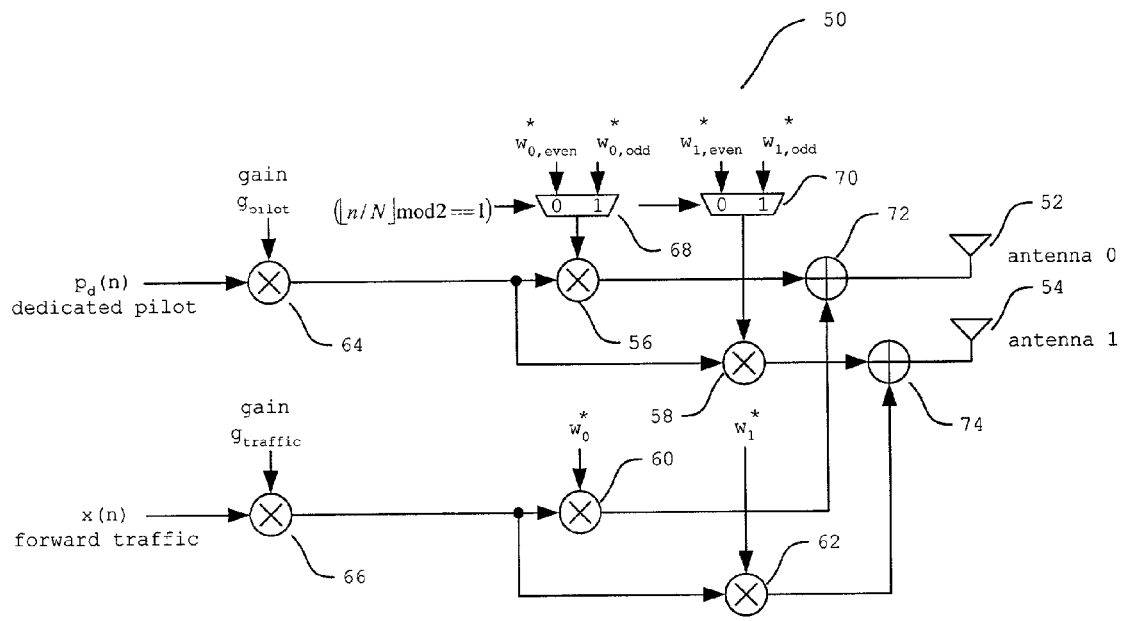
FIG. 4 is a simplified block diagram of one embodiment of a transmitter constructed according to the present invention.

FIG. 4 is a simplified block diagram of a BS transmitter 50 mode according to one possible embodiment of the present invention. For ease of illustration, two antennae, a first antenna 52 and a second antenna 54 are shown, but it will be appreciated that the present invention may easily be scaled to any number of antennae. Also for ease of illustration, although BS hardware corresponding to one mobile unit is shown, the transmitter 50 will typically have analogous hardware for a number of other users.

As shown in FIG. 4, the transmitter 50 comprises a plurality of multipliers 56, 58, 60, 62, 64 and 66, summers 72 and 74, and multiplexers 68 and 70. Multipliers 64 and 66 multiply a dedicated pilot signal and a forward traffic signal, respectively, with corresponding gains (with real, positive values). Multipliers 60 and 62 multiply the forward traffic signal by weights from the weight vector w, where w=$[w_0 \ w_1]^T$; where superscript T is defined as transpose (not to be confused with a complex conjugate transpose or hermitian transpose); and where $w_0$ is the weight for the first antenna 52 and $w_1$ is the weight for the second antenna 54. The weight values are described below in more detail. $w_{0,odd}$ and $w_{0,even}$, weights from the weight vectors $w_{odd}$ and $w_{even}$, respectively, are provided as inputs to the multiplexer 68, which alternates between them. Similarly, $w_{1,odd}$ and $w_{1,even}$ weights are provided as inputs to the multiplexer 70, which alternates between them. The weighted traffic and pilot signals are summed by the summers 72 and 74 and transmitted by the first antenna 52 and the second antenna 54, respectively. The mathematical representation of the waveform transmitted by the antennae 52 and 54 is described below in more detail.

Figure 5:
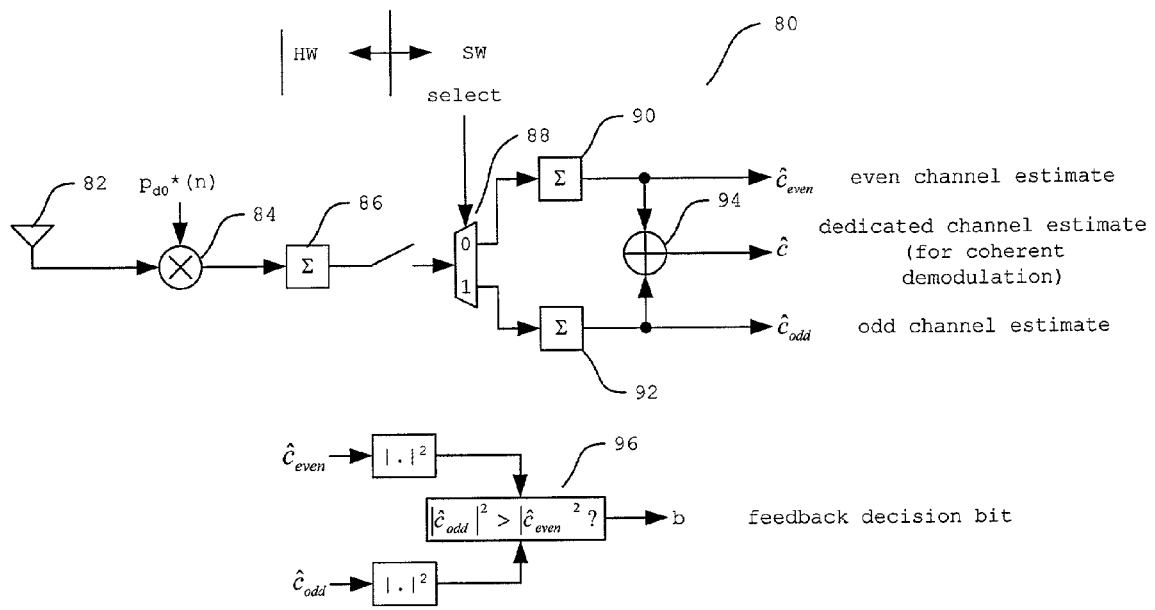
FIG. 5 is a simplified block diagram of one embodiment of a receiver constructed according to the present invention.

FIG. 5 is a simplified block diagram of an MS receiver 80 according to one possible embodiment of the present invention which demonstrates the principle of the feedback decision made by the MS. The receiver 80 comprises an antenna 82, a multiplier 84, and an accumulator 86. The receiver 80 further comprises a demultiplexer 88, accumulators 90 and 92 and a summer 94, which are preferably implemented in software. Signals received by the antenna 82 are multiplied by a pilot despreading code, as is well known in DS-CDMA systems, and the result is passed to accumulator 86, which accumulates a symbol from the chips it receives. "Even" and "odd" channel estimates are alternately accumulated in the accumulators 90 and 92. The even and odd estimates (i.e., the estimates for the alternating even and odd time slots) are summed by the summer 94 to generate a dedicated channel estimate (for coherent demodulation). Also, in a decision block 96 the power of the even and odd estimates are compared and the value of a feedback bit is set depending upon which of the two estimates indicates a greater power. In other words, the receiver 80 determines the power of the received pilot in the odd and even time slots, and determines whether the received power in the odd or the even slot was greater.

Figure 6:
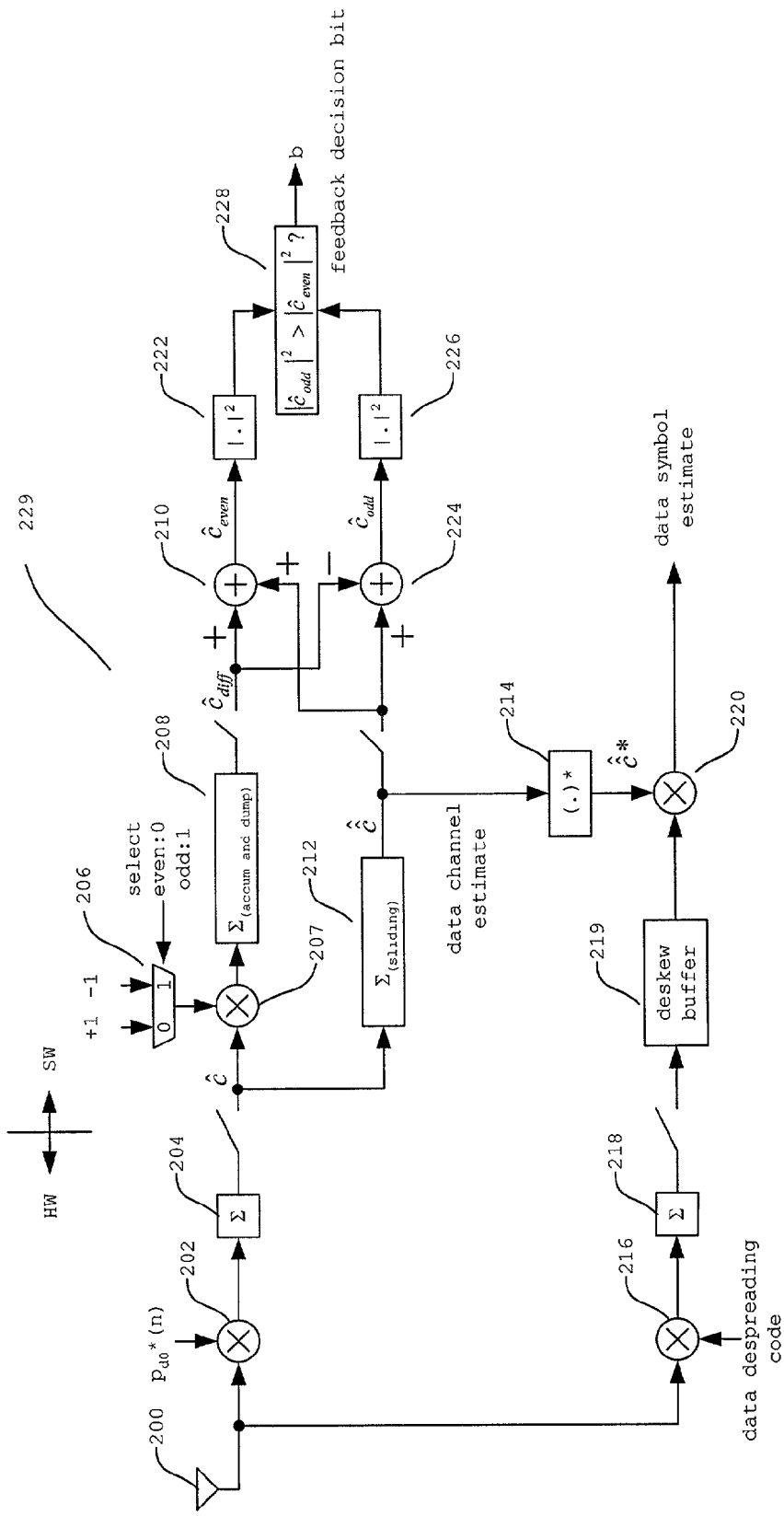
FIG. 6 is a block diagram of one embodiment of a receiver constructed according to the present invention.

FIG. 6 is a block diagram of a preferred embodiment of a receiver (e.g., an MS) 229 constructed according to this invention. FIG. 6 illustrates the efficient use of the pilot format to both aid antennae adaptation and to demodulate incoming data. The pilot is used to extract a preliminary channel estimate $\hat{c}$ using the multiplier 202 and the accumulator 204. A sliding window filter 212 maintains the data channel estimate $\hat{\hat{c}}$. The preliminary data symbol estimates are generated by multiplying the data despreading sequence with the received signal using a multiplier 216 and accumulating the result in an accumulator 218. These preliminary symbol estimates are then delayed in a deskew buffer 219. The data channel estimate $\hat{\hat{c}}$ is conjugated in a conjugation unit 214 and multiplied with the preliminary data symbol estimates by a multiplier 220 to generate the final data symbol estimates. A channel difference estimate is simultaneously maintained through a separate data path. The preliminary channel estimate $\hat{c}$ is inverted for odd time slots and non-inverted for even time slots through the selection of the multiplexer 206 and application of ±1 in a multiplier 207, with this result accumulated in an accumulator 208 to generate $\hat{c}_{diff}$. When the measurement interval is complete, even and odd channel estimates are extracted from $\hat{c}_{diff}$ and $\hat{\hat{c}}$ using adders 210 and 224. The more powerful channel estimate is then selected using a decision block 228.

In the case of resolvable multipath, the MS tracks several versions of the received pilot, making channel estimates for each one. In order to properly determine which Tx weight vector yields the best receive power, the MS combines the channel estimate powers from each path before performing a decision comparison. Similarly, if the MS 229 has multiple antennae, the decision is based on the sum of channel estimate powers over all antennae.

The same method can be applied to soft handoff, where multiple base stations may be transmitting the same data to the MS with individually adjusted TxAA weight vectors. That is, the processing of the MS can be applied to each BS individually, and the odd/even power summations used to determine the feedback bit is the summation of the powers for each path and for each BS. All BS's receive the same feedback bit and adjust accordingly. This is almost effectively considering the weight vector to be a concatenation of the individual BS weight vectors. Each BS individually normalizes its weight vector. The described method provides a very simple manner for the TxAA to be distributed across several BS's with no increase in MS complexity.

The following describes in greater detail the operation of the transmitter 50 and receiver 229 described above with reference to FIGS. 4 and 6, respectively. The following definitions are used in the description below:

n Time index, at the nyquist rate (chip rate for DS-CDMA).
m Time index at decimated (slot) rate, m=$\lfloor n, N \rfloor$.
K Number of users to which the BS is transmitting.
N Duration of the pilot even/odd banking slot.
M Number of slots between weight updates.
u(n) Transmitted vector at time n, $[u]_j$ is the $j^{th}$ antenna.
w(n) Antenna conjugated complex weights for the specific MS described, data channel.
$w_{even}$(n) Antenna conjugated complex weights for the specific MS described, even pilot channel.

$w_{odd}(n)$ Antenna conjugated complex weights for the specific MS described, odd pilot channel.

$x(n)$ Information bearing modulated signal for the specific MS described.

$p(n)$ Dedicated pilot for the specific MS described.

$g_{pilot/traffic}$ Gain for the pilot/traffic channel for the specific MS described.

The complex baseband representation of the transmitted waveform at the antenna, characterizing the amplitude and phase of the modulated radio carrier transmitted by the antenna (such complex baseband representations are well known, see, e.g., John Proakis, *Digital Communications*, 1995, Third Edition, McGraw-Hill Inc., New York, N.Y.), is given as follows. The equation adds a subscript k differentiating the signals for the plural mobiles.

$$u(n) = \sum_{k=0}^{K-1} (g_{k,traffic} w_k * (n) x_k(n) + g_{k,pilot}((\lfloor n/N \rfloor \mod 2 == 0) w_{k,even} * (n) + (\lfloor n/N \rfloor \mod 2 == 1) w_{k,odd} * (n)) p_k(n))$$

For conciseness of presentation, the following text focuses on the present invention's method from the point of view of a specific mobile with an arbitrary index k. The subscript k is omitted hereon, and the same operation is performed for all mobiles.

In particular, the odd transmit weight is applied to the dedicated pilot on odd time slots and vice versa for the even weights. This is the transmission of the probing signal which the receiver uses to generate feedback. To ensure proper coherent demodulation, the even/odd weights are preferably constrained by the following relationship:

$$w(n) = \frac{w_{even}(n) + w_{odd}(n)}{2}$$

It is worth noting that when the odd and even test weights are generated by the perturbation technique described below in more detail, then it is valid to consider that $$w_{base}(n) \cong \frac{w_{even}(n) + w_{odd}(n)}{2},$$

and hence one may in that case use $w_{base}(n)$ as the weight vector applied to the data channel.

Figure 7:
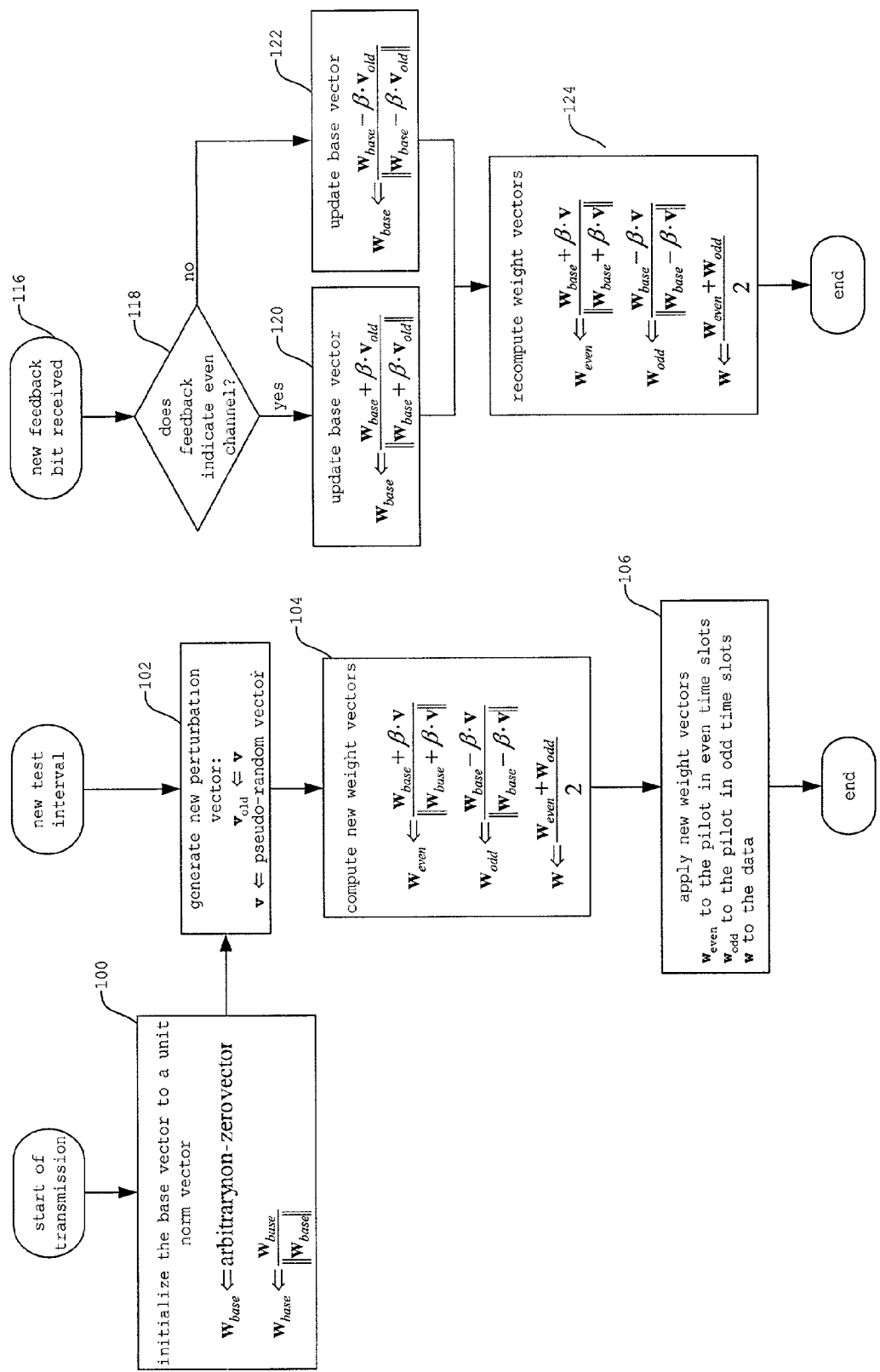
FIG. 7 is a flow chart that outlines pertinent features of the operation of the transmitter shown in FIG. 4.

FIG. 7 is a flow chart that outlines pertinent features of the operation of the transmitter 50. In block 100, a vector $w_{base}$ is initialized to an arbitrary vector with a unit norm. In block 102, a new test perturbation vector $v(n)$ is generated. Each vector entry is a complex number and corresponds to one of the antennae 52 or 54; each such entry therefore corresponds to a test weight to be applied to the transmission of the pilot signal over a particular antenna. The test perturbation vector is preferably determined in a manner such that its entries appear mutually independent. As a point of reference, it is assumed that the expected value (or long term average over many realizations) of the magnitude squared of each entry of v is 2, so that $E(\|v\|^2)=2 \cdot$(number of antennae). In this way, the amplitude of the applied perturbation is encompassed in the algorithm parameter β, as described below. For example, v(n) could equal $[\pm 1 \pm j, \ldots \pm 1 \pm j]^T$ (v(n) would have just two entries for the example transmitter of FIG. 4), where the +'s and −'s for the entries are randomly determined. However, the preferred v(n) is a complex Gaussian vector of uncorrelated entries with variance of 2.

In block 102 the current value of v is stored as $v_{old}$ and a new value is determined for v. The old value is stored so that when the feedback is received at a later time due to feedback latency (block 116) the transmitter 50 knows which perturbation vector the feedback corresponded to and can adapt accordingly. In block 104, even and odd weights and data channel weights are updated based on the new value for v. This is summarized as follows.

When beginning of test interval, $v_{old} \Leftarrow v$, $v \Leftarrow$ normalized test perturbation vector, new value every NM time indices;

$$w_{even} \Leftarrow \frac{w_{base} + \beta \cdot v}{\|w_{base} + \beta \cdot v\|};$$

$$w_{odd} \Leftarrow \frac{w_{base} - \beta \cdot v}{\|w_{base} - \beta \cdot v\|};$$

$$w \Leftarrow \frac{w_{even} + w_{odd}}{2}.$$

End.

Note: the base weight vector is only updated when feedback is received.

The normalization of the even/odd weight vectors is applied (the 2-norm is used) so that the total power transmitted in even and odd time slots is equal. This normalization prevents the MS 229 from simply selecting the weight vector with the larger transmit power. Rather, the MS 229 must select the weight vector which delivers the maximum power to the mobile for the given transmit power, which is determined by the traffic and pilot channel gains $g_{traffic}$ and $g_{pilot}$.

In block 106, the weights determined in block 104 are applied to the pilot signal. In particular, $w_{even}$ is applied to the pilot signal during even time slots and $w_{odd}$ is applied to the pilot signal during odd time slots, using the multiplexers 68 and 70 as is shown in FIG. 4. In addition, w is applied to the traffic signal during both even and odd slots. The pilot signal and the traffic signal, as modified according to block 104, are transmitted from the antennae 52 and 54. More precisely, a sinusoidal carrier wave is generated for each of the antennae 52 and 54. Each of these carrier waves is modulated by the traffic and pilot signals (modulating signals) as modified according to block 104. Viewed at from another perspective, the weight w adjusts the amplitude and phase of the plurality of radio carrier signals as those carrier signals are modulated by the traffic and pilot signals (modulating signals).

In block 116, which is shown as disjoint from blocks 100-106 for reasons that will be described below, the transmitter 50 receives a feedback bit transmitted by the MS 229. This feedback bit is based on the decision from the MS 229, which indicates which of the even or odd channels resulted in a greater received signal power and determines the weight updates for the transmitter 50. In block 118, the transmitter determines whether the even weight yields greater power by checking the value of the feedback bit. In one embodiment, a value of "0" indicates that the even channel is better. If so, control passes to block 120, which sets equal to $w_{even}$. In broader terms, $w_{base}$ is a function of $w_{even}$ and $w_{odd}$. In the preferred embodiment, the function is a selection of the preferred weight, including combinations thereof, are contemplated by the present invention. Otherwise, control passes to block 122, which sets $w_{base}$ equal to $w_{odd}$. In block 124, the even and odd weights $w_{even}$ and $w_{odd}$ and the data weight w are updated based on the new $w_{base}$. This is summarized by the following pseudo-code:

when feedback received
if (feedback==0, indicating even channel is better)

$$w_{base} \Leftarrow \frac{w_{base} - \beta \cdot v_{old}}{\|w_{base} + \beta \cdot v_{old}\|};$$

else $$w_{base} \Leftarrow \frac{w_{base} - \beta \cdot v_{old}}{\|w_{base} - \beta \cdot v_{old}\|};$$

end $$w_{even} \Leftarrow \frac{w_{base} + \beta \cdot v}{\|w_{base} + \beta \cdot v\|};$$

$$w_{odd} \Leftarrow \frac{w_{base} - \beta \cdot v}{\|w_{base} - \beta \cdot v\|};$$

$$w = \frac{w_{even} + w_{odd}}{2};$$

end

As noted above, block 116 (and related blocks) are shown as disjoint from blocks 100-106. This is because the processes represented by these two sets of blocks are independent of one another, as can be seen from FIG. 10, a timing diagram that shows a possible timeline for weight adjustment and channel measurement. Waveform 130 shows the timing of updates to $w_{base}$, which are performed in blocks 120 and 122. Waveform 132 shows updates to v, which are performed in block 102. Waveforms 134 and 136 show updates to $w_{even}$ and $w_{odd}$, which are performed in blocks 104 and 124. Waveform 138 shows updates to the data channel weight vector w, which are performed in blocks 104 and 124.

As shown by the waveform 132, the test vector v (step 102) is periodically generated and is independent of feedback received from the MS 229. The updates to $w_{even}$ and $w_{odd}$ caused by a v are indicated by solid vertical lines in the FIG. 10 while the updates to $w_{even}$ and $w_{odd}$ caused by feedback received from the MS 229 are indicated by the dashed vertical lines in the Figure.

The parameter β is an algorithm constant which is to be selected to improve performance. A large β allows the weight vector to adapt more quickly, but also introduces additional noise on the weight vector applied as a larger adjustment is made. For example, when the weights are settled near their optimal value, each weight is still constantly adjusted by ±βv. Also, β determines the size of the test perturbation applied to the weight vector, and hence will effect both the ability of the MS to correctly determine which test weight vector provides the larger power, and the amount of interference seen by other MS's. A larger β will cause the difference between the two test weight vectors to be larger, and hence it is more likely that this difference will exceed any noise contributions to the measurement by the receiver 80 or receiver 229. A larger β also causes more "splatter", wherein the antenna pilot transmission test weights are perturbed more from the base weights, which are adjusted towards an optimal value, and hence the odd/even pilots cause more interference to other MS's than the data weight. As an enhancement to the present invention, it is possible to individually tune these two effects (i.e., the adaptation rate vs. weight noise tradeoff, and the noise immunity vs. splatter tradeoff) with a $\beta_1$ and a $\beta_2$, as is described later.

Figure 8:
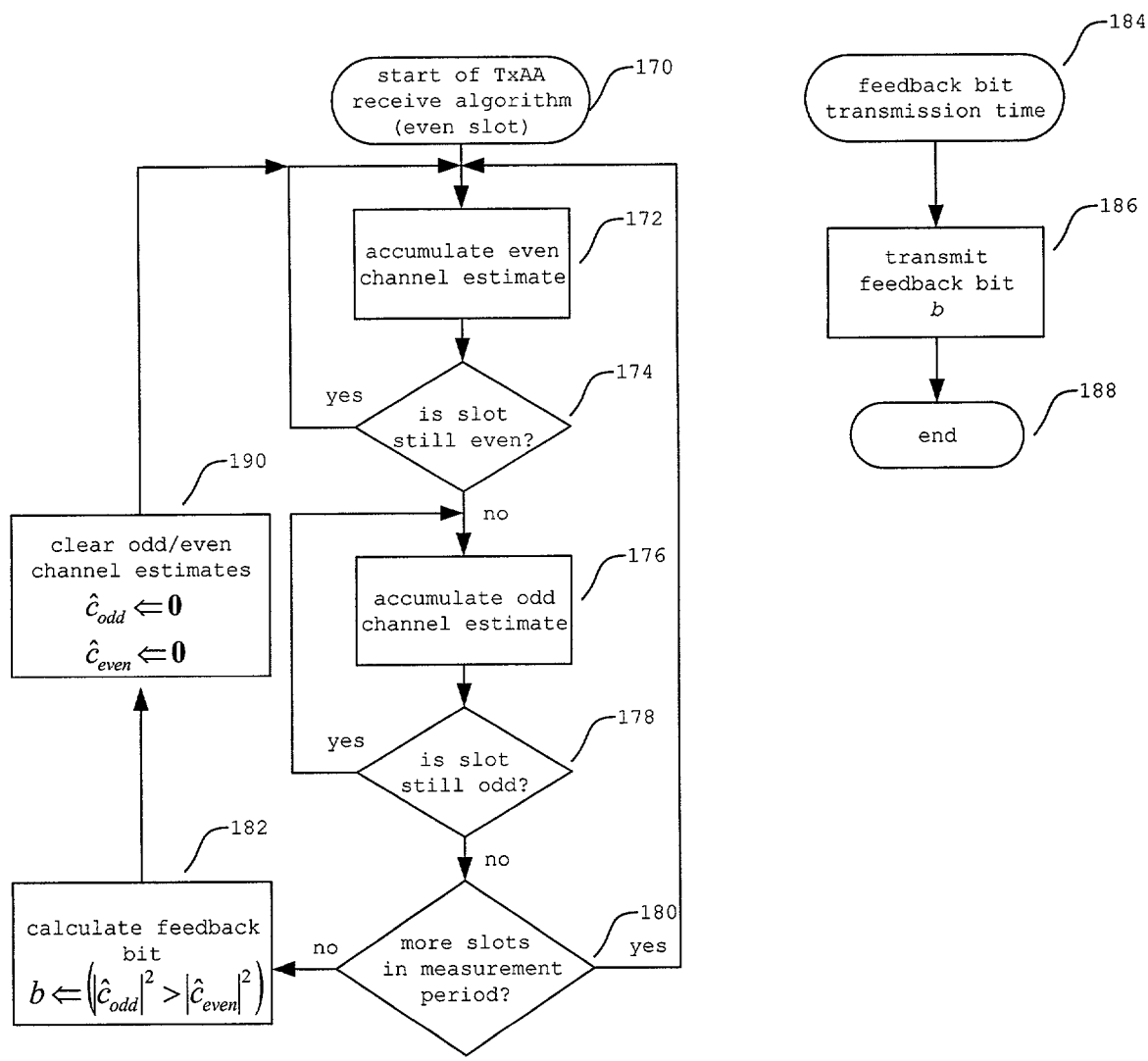
FIG. 8 is a flow chart that outlines pertinent features of the operation of the receiver shown in FIG. 5.

FIG. 8 is a flow chart that outlines pertinent features of the operation of the receiver of FIG. 5. In block 172 the even channel estimate is accumulated, which continues during the entire even time slot according to the decision determined at decision block 174. At the beginning of the odd time slot, the odd channel estimate is accumulated in block 176, which continues during the entire odd time slot according to the decision determined at a decision block 178. The even/odd channel accumulations continue until it is determined by block 180 that the measurement period is complete. When the measurement period is determined to be completed, the feedback decision is calculated and the resultant bit stored for transmission at the appropriate time in block 182. The odd and even channel estimates are then cleared in block 190 and the process is repeated for the new measurement period by returning to the processing block 172. At the appropriate time, which is independent of the timing of the channel estimation procedure just described, the MS starts transmission of the feedback bit, which is shown in processing blocks 184, 186, and 188.

Figure 9:
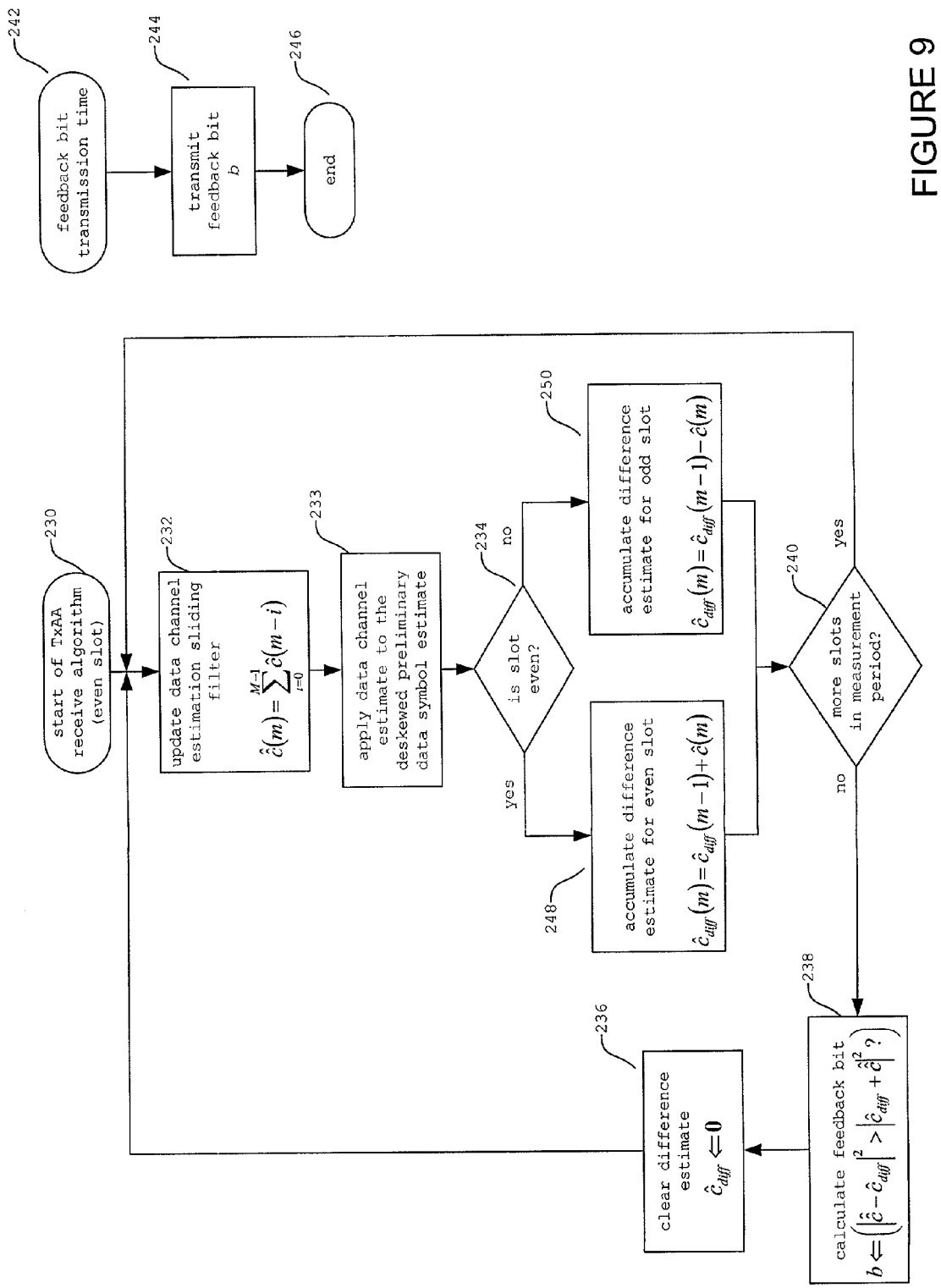
FIG. 9 is a flow chart that outlines pertinent features of the operation of the receiver shown in FIG. 6.

FIG. 9 is a flow chart, which outlines the pertinent features of the operation of the receiver of the preferred embodiment of FIG. 6. In block 232 the sliding window data channel estimate is updated. The duration of the sliding window is shown as M slots, covering the duration of a measurement interval, as is preferred. The data channel estimate is applied to the preliminary symbol estimate in block 233. The state of the slot being processed is used in block 234 to determine the sign of the channel difference accumulation by adding the preliminary channel estimate in block 248 if it is an even slot, or subtracting the preliminary channel estimate in block 250 if it is an odd slot. Block 240 determines if the measurement interval is complete, continuing the process by returning to block 232 if the interval is not complete. When the measurement period is determined to be completed by block 240, the feedback decision is calculated and the resultant bit stored for transmission at the appropriate time in block 238. The difference estimate is then cleared in block 236 and the process returns to block 232. At the appropriate time, which is independent of the timing of the channel estimation procedure just described, the MS 229 starts transmission of the feedback bit, which is shown in blocks 242, 244 and 246.

Figure 10:
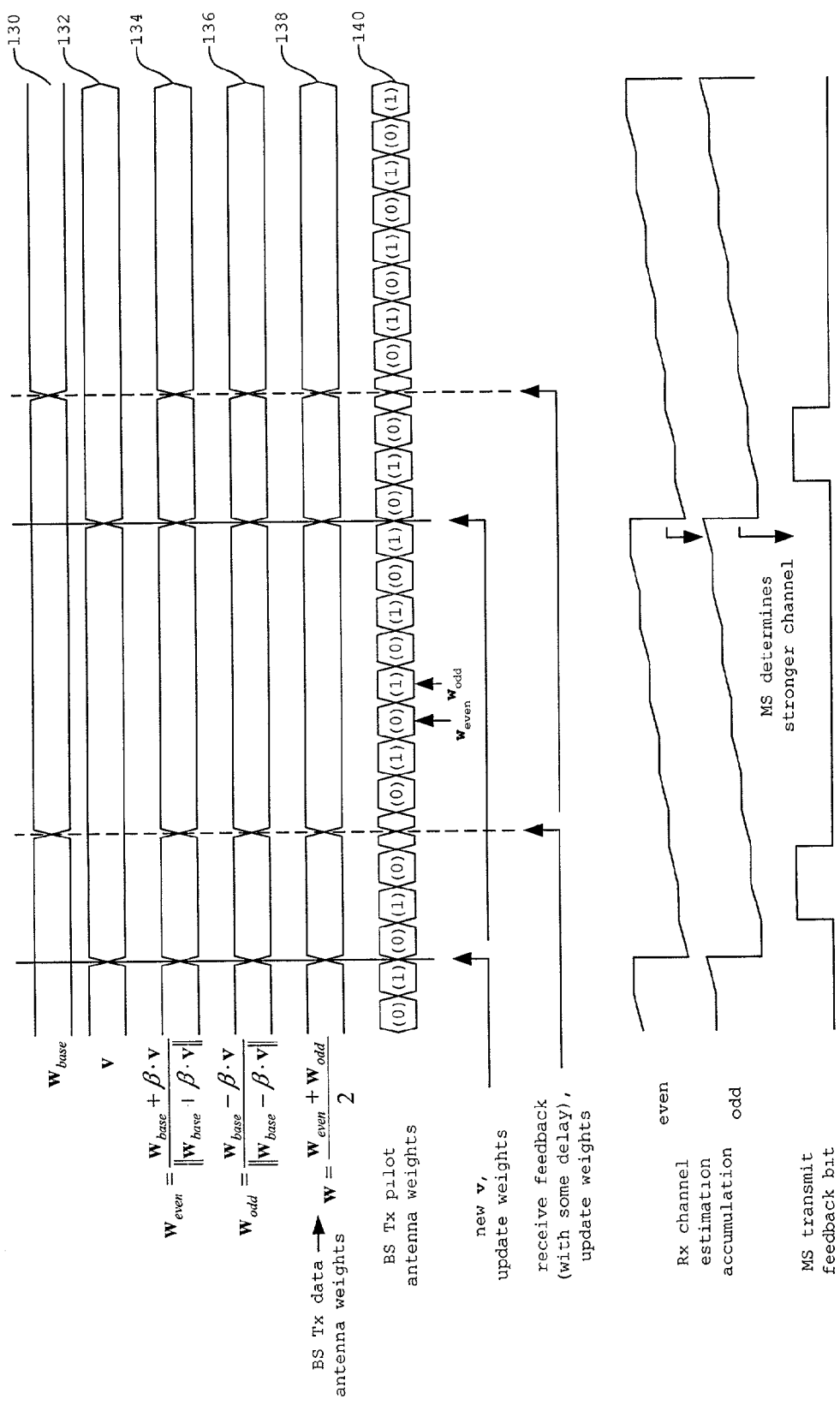
FIG. 10 is a timing diagram that shows a preferred timeline for weight adjustment, channel measurement and feedback.

FIG. 10 shows a time line of this process with certain parameters selected by way of example. The accumulations for this example are over 12 time slots, the feedback bit is transmitted one time slot later, and the transmit weight update occurs as soon as the transmitter 50 receives it. In this case, the transmitter 50 updates the test perturbation vector v prior to receiving the update, so that the measurement of the new perturbation can begin. Because each update is fairly small, this mechanism allows for increasing the efficiency of the measurement time. The measurement of the new perturbation will be insignificantly modified by the overlap.

As previously described with reference to FIG. 7, at the beginning of each test period, the transmitter 50 determines a new perturbation vector v and applies it to the old $w_{base}$. As soon as the feedback arrives, this same new v is applied to produce the new $w_{base}$. This allows for maximizing the measurement interval without delaying the next test perturbation. Because the updates are relatively small, the new perturbation will still yields a valid measurement result even though it is applied to both the old and the new $w_{base}$.

The invention may be implemented for "soft handoff" systems. Soft handoff in DS-CDMA systems is an operational mode wherein multiple BS's, each using a different spreading code, transmit the same data to a single MS. The reception at the mobile of these multiple signals benefits performance by providing diversity. According to one embodiment of the present invention, soft handoff may be implemented in the following manner. Each BS independently generates test weight vectors $w_{odd}$ and $w_{even}$ through the independent generation of test perturbation vectors v. Each BS transmits the pilot and data as previously described. The MS makes a single decision based on the summation of the channel estimate powers for all BS's, and transmits a single feedback bit as previously described. Each BS independently implements the weight adaptation as previously described, without regard to the fact that it is in soft handoff mode. In summary, the MS uses the summation of all BS powers for the decision, and each BS behaves exactly as though it would even if not in soft handoff mode.

The application of the system described herein to the IS-95 standard and its derivative cdma2000 most likely would use N=64 chips (chip rate 1.2288 MHz, giving 52.083 us time multiplexing) and 1.25 ms decision intervals. The length of the total even/odd accumulation is implementation specific in the mobile, but probably 8N, 12N, 16N or 24N (½ of that for each of the even/odd accumulations). Another possible alternative would be 0.625 ms decision intervals, in which case the total even/odd accumulation would probably not exceed 12N. These timings fit well into the existing specification as 64 chips is the original symbol duration from IS-95 and still a common time unit, and 1.25 ms is a "power control group", the timing upon which over-the-air closed loop power control updates take place, and is ¹⁄₁₆ of the most common frame length, 20 ms. It will be appreciated that the present invention is not limited to any of the specific quantities described above.

Some Alternative Embodiments

It will be appreciated that it is possible to use more than 2 time slots and a corresponding number of test weight vectors, which may be generated from a corresponding number of test perturbation vectors. Also, more than 1 bit can be used as feedback, corresponding to a greater number of time slots.

The generation of the test perturbation v can be implemented in many ways. Such generation should be pseudo-random so that over the long term the summation $\Sigma vv^H$ approaches an equi-diagonal matrix, where the superscript H is defined as a hermitian or conjugate transpose. The random elements can be generated as some probability distribution other than the binary one described (e.g., uniform distribution, Gaussian distribution). Rather than pseudo-random generation, the vector can be generated by cycling through some fixed sequence. For example, the sequence $[1\ 0\ 0\ \ldots\ 0]^T$ $[j\ 0\ 0\ \ldots\ 0]^T$ $[0\ 1\ 0\ \ldots\ 0]^T$ $[0\ j\ 0\ \ldots\ 0]^T$

...

can be selected in one embodiment, to scan through each weight independently. This satisfies the requirement on the long term summation of $vv^H$.

The value of β can itself be adaptive. For fast varying channels, the value could be made larger, and for slower channels it could be made smaller. This would allow for some optimization of β with respect to channel variation rate.

The weight update can be further parameterized, allowing independent optimization of the adaptation rate vs. weight noise ($\beta_1$) and the measurability in noise vs. splatter ($\beta_2$) tradeoffs. $\beta_1$ is then applied to the update of $w_{base}$, while β is applied to the test weight vectors $w_{odd}$ and $w_{even}$ which define the probing signal. This can be performed in accordance with the following pseudo-code:

when feedback received or new test interval
    if (new test interval)
        $v_{old} \Leftarrow v$
        v⇐normalized test perturbation function
    end
    if (feedback received)
        if (feedback==0, indicating the even channel was better)

$$w_{base} \Leftarrow \frac{w_{base} - \beta_1 v_{old}}{\|w_{base} + \beta_1 v_{old}\|};$$

else $$w_{base} \Leftarrow \frac{w_{base} - \beta_1 v_{old}}{\|w_{base} - \beta_1 v_{old}\|};$$

end
    end $$w_{even} \Leftarrow \frac{w_{base} + \beta_2 v}{\|w_{base} + \beta_2 v\|};$$

$$w_{odd} \Leftarrow \frac{w_{base} - \beta_2 v}{\|w_{base} - \beta_2 v\|};$$

$$w \Leftarrow \frac{w_{even} + w_{odd}}{2};$$

end

The parameters used in the time line of FIG. 10 are exemplary only and can be easily modified.

The exact nature of the feedback channel is not specified. It can be implemented as a puncturing onto the data channel as the power control bit is implemented in IS 95, or onto the pilot channel as in cdma2000, or in some other manner.

The MS can generate the channel estimations in a different manner than described.

The weight normalization described above is a total power normalization. Other normalizations can be chosen.

Alternate treatments of soft handoff can be used, though the previously described method is preferred. Rather than using only 1 feedback bit, a feedback bit may be included for each such base station (or each such BS that has adaptive Tx antennae enabled) so that the mobile can send commands to each, or alternatively can time-multiplex the feedback bits between the various BS's. The latter would result in a significant loss of performance to accommodate the slower adaptation times.

The test weights $w_{odd}$ and $w_{even}$ are described as being applied in separate time slots. It is possible to use other orthogonal modulation techniques such that they may be extracted. For example, rather than an odd and even time slot, odd and even orthogonal codes (perhaps from a set of Walsh codes) could be used. This is not desirable for the preferred embodiment but may be desirable in other embodiments.

While the transmission medium is assumed to be the propagation of radio waves from transmitting antennae to a receiving antenna (or antennae), the invention is obviously extendable to the propagation of waves in other media. For example, the medium could be acoustic waves in a fluid or gas, from transmitting transducers to a receiving transducer (or transducers).

A TxAA weight adaptation technique has been described. A transmit adaptive antenna weighting with nulling using binary gradient feedback technique is now described.

Transmit Adaptive Antenna Weighting with Nulling using Binary Gradient Feedback Technique The generating transmit adaptive antenna weighting with nulling using binary gradient feedback technique relies upon the observation that overall interference in a communication system can be reduced by steering nulls to proximate receivers. The present generating transmit adaptive antenna weighting with nulling using binary gradient feedback technique attempts to maximize an inverse cost function that allows a communication system to provide adequate power to a desired receiver and reduce interference to proximate receivers. In accordance with the present technique, a feedback algorithm that tracks a normalized weight vector toward a maximum of the inverse cost function is utilized. One embodiment of the technique described hereinbelow utilizes the Transmit Adaptive Antenna Weighting (TxAA) weight adaptation technique described above as the feedback algorithm with a normalized test perturbation vector (e.g., Gaussian test perturbation vector) that is scaled according to an estimated interference power to all proximate receivers. The inventive method extracts a coarse estimate of the gradient of the inverse cost function and updates the weighting vector accordingly. The inverse cost function of the present invention is now described in some detail.

The following description uses the definitions below:

n Time index. at the nyquist rate (chip rate for DS-CDMA).
i Time index at the weight update rate, i=n/N'.
K Number of users to which the BS is transmitting.
N Duration of the weight update interval in units of sample times (indexed i). The channel c is assumed approximately constant over this interval as well.
M Number of slots between weight updates.
$u(n)$ Transmitted vector at time n, $[u]_j$ is the $j^{th}$
$w_k(n)$ Antenna complex weights applied for MS k.
$c_k(n)$ Complex baseband model of the channel response from each antenna to the receiver MS k.
$x_k(n)$ Information bearing modulated signal for user k.
$p_k(n)$ Dedicated pilot for user k.
$P^{(T)}_{k,pilot/traffic}$ Gain for the pilot/traffic channel for the specific MS described.

The complex baseband representation of the transmitted waveform is given as follows:

$$u(n) = \sum_{k=0}^{K-1} \left( \sqrt{P^{(T)}_{k,traffic}} \cdot x_k(n) \cdot w_k * (n) + \sqrt{P^{(T)}_{k,pilot}} \cdot p_k(n) \cdot w_{k,pilot} * (n) \right)$$

where the traffic weight vector for the $k^{th}$ user $w_k$ and the pilot vector for the $k^{th}$ user $w_{k,pilot}$ will generally be modified much less frequently than the time index n. In particular, the traffic weight vector $w_k(n)$ will change once every N samples. The pilot transmission is the probing signal used by the receiver to generate feedback, and also is used by the receiver to assist in coherent demodulation.

A single channel gain vector, $c_m$, for a receiver indexed m, can be computed assuming that there is only one receiver (i.e., flat fading) and a single time resolvable path for each receiver. The received waveform corresponding to the complex baseband representation is given as follows:

$$r_m(n) = \sum_{k=0}^{K-1} \left( \sqrt{P^{(T)}_{k,traffic}} \cdot x_k(n) \cdot w_k^H(n) c_m(n) + \sqrt{P^{(T)}_{k,pilot}} \cdot p_k(n) \cdot w_{k,pilot}^H(n) c_m(n) \right)$$

A general inverse cost function for the present invention is given as follows:

$$\text{general inverse cost function} = \frac{\text{delivered power to a desired receiver}}{\text{interference power to all proximate receivers}}$$

The present technique attempts to maximize the general inverse cost function by utilizing a feedback algorithm. One embodiment of the present technique utilizes the feedback algorithm described in the TxAA weight adaptation technique. The TxAA weighting inverse cost function incorporates a normalized weight vector and is given in the following Equation 1:

$$J = \frac{|w_m^H(i) c_m(i)|^2}{\sum_{k=0}^{K-1} A_k \left| w_m^H(i) \frac{c_k(i)}{\|c_k(i)\|} \right|^2 + B} ; \quad \text{(Equation 1)}$$

where $J$ = inverse cost function

Where $A_k$ is an adjustment parameter that allows for deeper nulling to some specific users according to a set of requirements such as quality of service (QOS) and power control requirements. An exemplary algorithm for determining the adjustment parameter ($A_k$) is described further below.

The inverse cost of equation 2 is maximized by selecting the weights according to:

$$w_m = \arg \max_{\substack{w_m \\ \|w_m\|=1}} \left( \frac{w_m^H c_m c_m^H w_m}{w_m^H \Phi w_m} \right) \quad \text{(Equation 2)}$$

where $\Phi = \sum_{k=0}^{K-1} A_k c_k c_k^H + B \cdot I.$

The solution to Equation 2 is the solution to a generalized eigenproblem. Thus, the maximum of Equation 2 occurs when the gradient of the defined inverse cost with respect to the weight vector is zero. The solution to Equation 2 is represented by the following Equation 3:

$$w_k = \frac{\Phi^{-1} c_k}{\|\Phi^{-1} c_k\|} \quad \text{(Equation 3)}$$

The solution represented by Equation 3 can be utilized to provide a weight vector estimate of a channel when an algorithm (e.g., gradient algorithm described hereinbelow) has converged to the solution of w without direct a priori knowledge of c. The basic operation of the generating transmit adaptive antenna weighting with nulling using binary gradient feedback technique is now described in detail with reference to FIG. 11.

Figure 11:
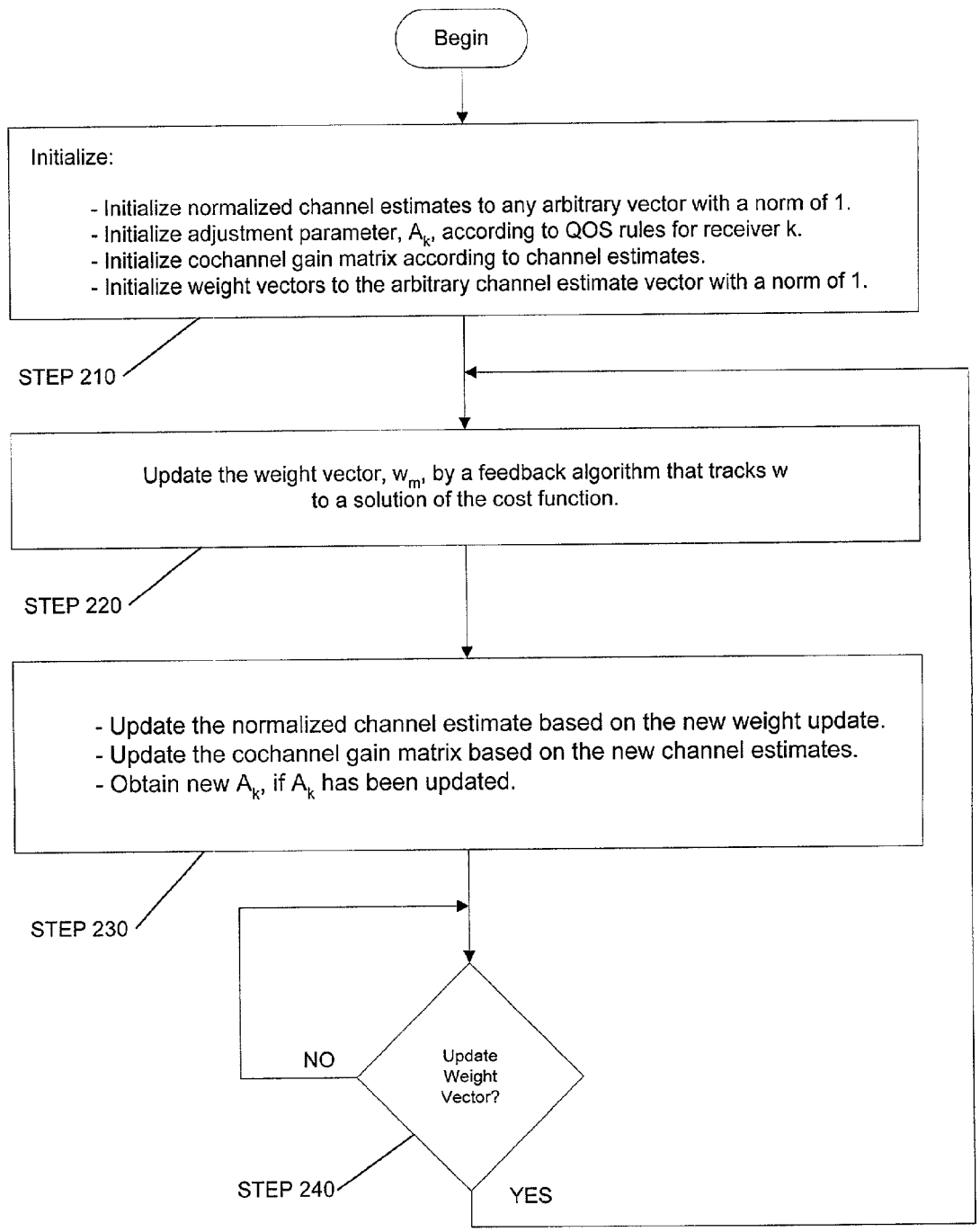
FIG. 11 is a flowchart of the basic operation of the generating transmit adaptive antenna weighting with nulling using binary gradient feedback technique.

FIG. 11 is a flowchart of the basic operation of the transmit adaptive antenna weighting with nulling technique of the present invention. The basic operation of the present inventive technique 200 begins at a STEP 210 whereat the technique initializes four values: a normalized channel estimate, an adjustment parameter, a cochannel gain matrix and a weight vector. The normalized channel estimate (Ĉm̂) is initialized to any arbitrary vector with a norm of 1. In one exemplary embodiment, the normalized channel estimate (Ĉm̂) is initialized according to the following equation:

$$\hat{c}_m = \frac{a}{\|a\|};$$

where a is an arbitrary vector.

The adjustment parameter ($A_k$) is initialized according to QOS, power control or other rules that result in nulling of proximate receivers. One exemplary algorithm for implementing the adjustment parameter ($A_k$) is described further below. In one exemplary embodiment, the adjustment parameter ($A_k$) is initialized according to the QOS for a receiver k as represented by the following equation:

$$A_k = QOS(k)$$

The cochannel gain matrix ($\hat{\Phi}$) is initialized according to channel estimates. In one exemplary embodiment, the cochannel gain matrix ($\hat{\Phi}$) is initialized according to the following equation:

$$\Phi = \sum_{k=0}^{K-1} A_k \hat{c}_k \hat{c}_k^H + B \cdot I$$

The weight vector ($w_m$) is initialized to the arbitrary channel estimate vector with a norm of 1. In one exemplary embodiment, the normalized channel estimate ($w_m$) is initialized according to the following equation:

$$w_m = \hat{c}_m$$

Referring again to FIG. 11, after the STEP 210, the technique proceeds to a STEP 220 whereat the technique updates the weight vector ($w_m$) using a feedback algorithm that tracks $w_m$ to a solution of the inverse cost function (e.g., Equation 3) given the previous $w_m$ and the estimate of $\Phi$. In one exemplary embodiment, the TxAA Weight adaptation technique is utilized as the feedback algorithm. In accordance with the exemplary embodiment, the weight vector is normalized so that any variation in transmit power arises from power control of $P^{(T)}$. The update of the weight vector can be represented by the following Equation 4:

$$w_m \Leftarrow \frac{f(w_m, c, \hat{\Phi})}{\|f(w_m, c, \hat{\Phi})\|} \quad \text{(Equation 4)}$$

Where $f(a, b, C)$ is any update function which returns a modification of the input value a which tracks towards a maximization of $$\frac{a^H b b^H a}{a^H C a}$$

i.e., any update function that tracks toward the solution of Equation 2). Preferably the function $f(a, b, C)$ utilizes feedback from the receiver based upon a transmitted probing signal, such as the gradient technique described later.

After the STEP 220, the technique proceeds to a STEP 230 whereat the normalized channel estimate ($\hat{c}_m$), the cochannel gain matrix ($\hat{\Phi}$) and the adjustment parameter ($A_k$) (if necessary) are updated. The normalized channel estimate ($\hat{c}_m$) is updated based on the new weight update that was determined in the STEP 220. In one embodiment, the technique utilizes the inverse of Equation 3 as represented by the following equation:

$$\hat{c}_m = \frac{\Phi w_m}{\|\Phi w_m\|}$$

The cochannel gain matrix ($\hat{\Phi}$) is updated based on the new channel estimates. In one embodiment, the technique utilizes the following equation:

$$\hat{\Phi} \Leftarrow \sum_{k=0}^{K-1} A_k \hat{c}_k \hat{c}_k^H + B \cdot I$$

The adjustment parameter ($A_k$) can be updated at the STEP 230 or independently. In one exemplary embodiment, the adjustment parameter ($A_k$) is determined independently from the basic algorithm 200. In accordance with the exemplary embodiment, the adjustment parameter ($A_k$) is updated at the STEP 230 if an independent feedback process has previously updated $A_k$. As described further below with reference to STEPS 316-324 of FIG. 12, the independent feedback process can incorporate power control and QOS requirements. After the STEP 230, the technique proceeds to a decision STEP 240 whereat the technique determines whether the weight vector ($w_m$) is to be updated, and if so, the technique returns to the STEP 220, else, the technique returns to the decision STEP 240. An exemplary method for updating the weight vector ($w_m$) is now described.

The present invention can utilize any method for updating the weight vector ($w_m$) (e.g., Equation 4) as long as the method tracks to the solution of the inverse cost function (e.g., Equation 3). The present inventive method can determine the weight vector as an iterative update of the weights that are specific to a receiver without direct measurement and state reporting of the channel from each individual antenna to the receiver.

An exemplary method for updating the weight vector ($w_m$) as an iterative update of a weight update function, f( ), that is referred to as a stochastic gradient method, is now described. In accordance with the stochastic gradient method, the above-described TxAA weight adaptation technique algorithm is utilized to implement the weight update function, f( ). The stochastic gradient method transmits pilot channels in even and odd time slots with perturbed weight vectors and the data is transmitted by a vector given by the mean of the even and odd time slot perturbed weight vectors. Thus, data can be coherently modulated in a simple manner. Perturbed vectors are scaled according to the estimated denominator of Equation 2. Thus, the normalization differs from the normalization described above with regard to the TxAA weight adaptation technique algorithm (see description of block 102 of FIG. 7). The function of the scaling is to ensure that both perturbed weight vectors produce equal interference power, and thus convergence occurs when the larger usable delivered power converges to the largest ratio of delivered usable power to interference power. The details of the stochastic gradient approach are now described.

Figure 12:
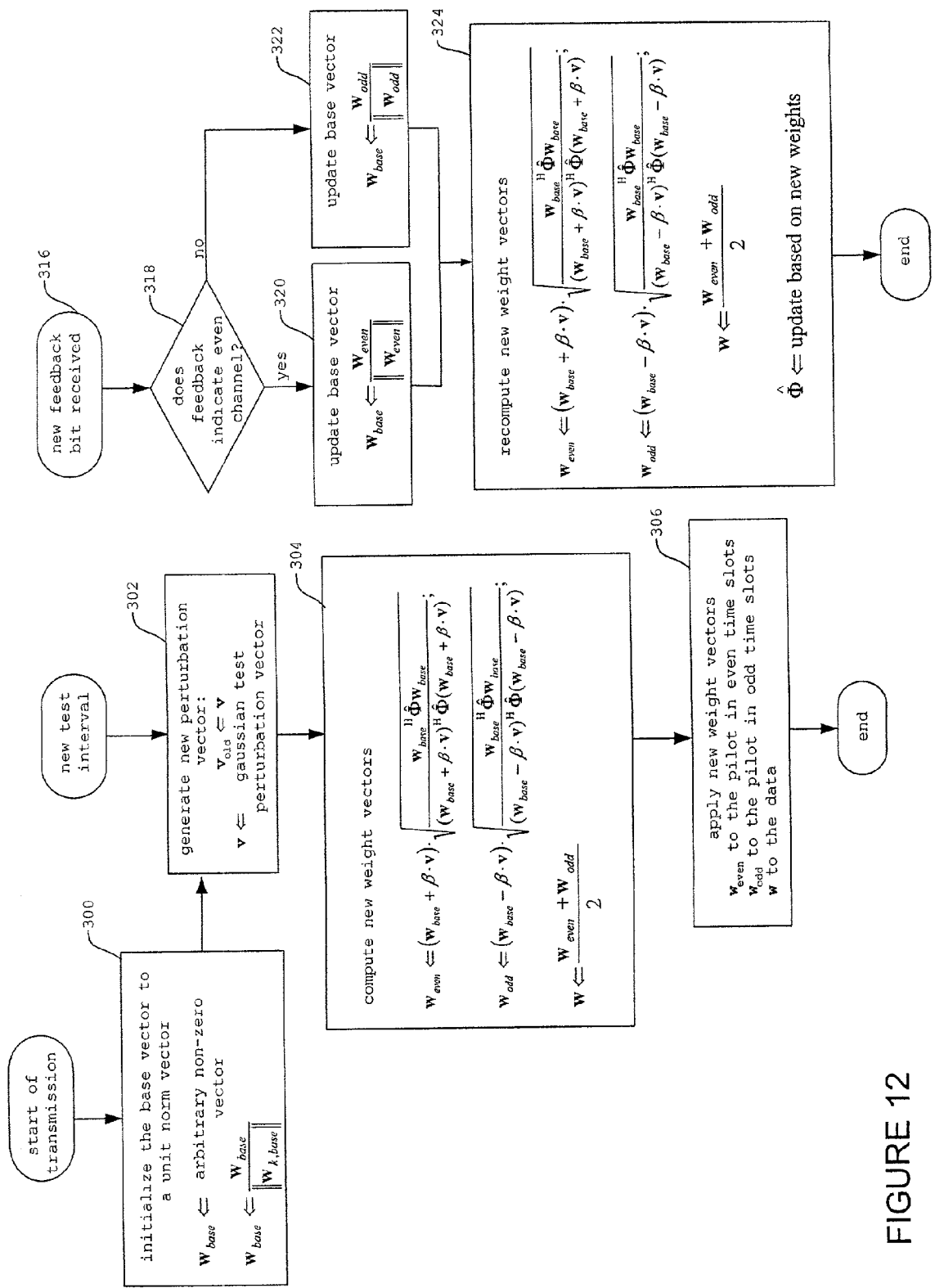
FIG. 12 is a flow chart that shows the operation of the stochastic gradient method.

FIG. 12 is a flow chart that shows the operation of the stochastic gradient method. The operations shown in FIG. 12 are performed for each mobile, and the index differentiating the various mobiles is not shown in the figure. As shown in FIG. 12, the method comprises two independent processes: a perturbation process and a feedback process. The perturbation process comprises STEPS 300-306 and the feedback process comprises STEPS 316-324. The perturbation process method begins at a STEP 300 whereat a vector, $w_{base}$, is initialized to an arbitrary non-zero vector with a unit norm. After the STEP 300, the method proceeds to a STEP 302 whereat the current value of v is stored as $v_{old}$ and a new value is determined for v. The old value is stored so that when the feedback is received at a later time (e.g., STEP 316) the transmitter 50 (FIG. 4) knows which perturbation vector the feedback corresponded to and can adapt accordingly.

At the STEP 302, the method generates a new test perturbation vector v(n). Each vector entry is a complex number and in an exemplary two antenna embodiment corresponds to one of the antennae 52 or 54 (FIG. 4); each such entry therefore corresponds to a test weight to be applied to the transmission of the pilot signal over a particular antenna. In one embodiment, the test perturbation vector is a Gaussian test perturbation vector such that the expected value (i.e., long term average over many realizations), E(v), is zero, while the expected value of the magnitude squared of each complex entry of v is 2, so that $E(vv^H)=2I$ (the variance of each constituent Gaussian random variable is unity, giving variance of 2 for each complex component). After the STEP 302, the method proceeds to a STEP 304 whereat the method computes new weight vectors.

In the STEP 304, even and odd weights and data channel weights are updated based on the new value for v. This is summarized by the following pseudo-code:

when beginning of test interval, all mobiles (mobile index omitted) perform:

$v_{old} \Leftarrow v$;

$v \Leftarrow$ Gaussian test perturbation vector, E(v)=0, $E(vv^H)$ =2I;

$$w_{even} \Leftarrow (w_{base} + \beta \cdot v) \cdot \sqrt{\frac{w_{base}^H \hat{\Phi} w_{base}}{(w_{base} + \beta \cdot v)^H \hat{\Phi}(w_{base} + \beta \cdot v)}};$$

$$w_{odd} \Leftarrow (w_{base} - \beta \cdot v) \cdot \sqrt{\frac{w_{base}^H \hat{\Phi} w_{base}}{(w_{base} - \beta \cdot v)^H \hat{\Phi}(w_{base} - \beta \cdot v)}};$$

$$w \Leftarrow \frac{w_{even} + w_{odd}}{2}$$

-end

Note: the base weight vector is only updated when feedback is received.

After the STEP 304, the method proceeds to a STEP 306 whereat the method applies the new weight vectors.

At the STEP 306, the method applies the weights determined in the STEP 304 to the pilot signal. In particular, $w_{even}$ is applied to the pilot signal during even time slots and $w_{odd}$ is applied to the pilot signal during odd time slots, using the multiplexers 68 and 70 (FIG. 4). In addition, w is applied to the traffic signal during both even and odd slots. The pilot signal and the traffic signal, as modified by their weight vectors according to the STEP 304, are transmitted from the antennae 52 and 54 (FIG. 4). More precisely, a sinusoidal carrier wave is generated for each of the antennae 52 and 54 (FIG. 4). Each of these carrier waves is modulated by the traffic and pilot signals (modulating signals) as modified according to the STEP 304. Viewed at from another perspective, the weight w adjusts the amplitude and phase of the plurality of radio carrier signals as those carrier signals are modulated by the traffic and pilot signals (modulating signals). The perturbation process ends at the STEP 306. The feedback process is now described in more detail with reference to FIG. 12.

As shown in FIG. 12, the method performs the feedback process (STEPS 316-324) independently from the perturbation process (STEPS 300-306). The feedback process method begins at a STEP 316 whereat the transmitter 50 (FIG. 4) receives a feedback bit that is transmitted by the MS 229 (FIG. 6). The feedback bit is based on the decision from the MS 229 (FIG. 6), which indicates which of the even or odd channels resulted in a greater received signal power and determines the weight updates for transmitter 50 (FIG. 5). After the STEP 316, the method proceeds to a decision STEP 318 whereat the transmitter 50 (FIG. 4) determines whether the even weight yields greater power than the odd weight by checking the value of the feedback bit. In one exemplary embodiment, a logical zero value is arbitrarily defined as a condition when the even channel yields greater power and conversely a logical one value is defined as a condition when the odd channel yields greater power. If the decision STEP 318 determines that the even weight yields greater power than the odd weight, the method proceeds to a STEP 320 whereat the method sets $w_{base}$ according to the following equation:

$$w_{base} \Leftarrow \frac{w_{even}}{\|w_{even}\|}$$

After the STEP 322, the method proceeds to a STEP 324.

If the method at the decision STEP 318 determines that the even weight yields less power than the odd weight (by checking the value of the feedback bit), the method proceeds to a STEP 322 whereat the method sets $w_{base}$ according to the following equation:

$$w_{base} \Leftarrow \frac{w_{odd}}{\|w_{odd}\|}$$

After the STEP 322, the method proceeds to a STEP 324 whereat the method re-computes new weight vectors.

At the STEP 324, the method determines the even and odd weights $w_{even}$ and $w_{odd}$ and the data weight w is updated based on the new $w_{base}$. This is summarized as follows with reference to the following pseudo-code:

when time for new perturbation if (feedback==0, indicating even channel is better)

$$w_{base} \Leftarrow \frac{w_{even}}{\|w_{even}\|};$$

else $$w_{base} \Leftarrow \frac{w_{odd}}{\|w_{odd}\|};$$

end $$w_{odd} \Leftarrow (w_{base} + \beta \cdot v) \cdot \sqrt{\frac{w_{base}^H \hat{\Phi} w_{base}}{(w_{base} + \beta \cdot v)^H \hat{\Phi}(w_{base} + \beta \cdot v)}};$$

$$w_{odd} \Leftarrow (w_{base} - \beta \cdot v) \cdot \sqrt{\frac{w_{base}^H \hat{\Phi} w_{base}}{(w_{base} - \beta \cdot v)^H \hat{\Phi}(w_{base} - \beta \cdot v)}};$$

$$w = \frac{w_{even} + w_{odd}}{2};$$

$\hat{\Phi} \Leftarrow$ update based on new weights

-end

The feedback process ends at the STEP 324. As described above, STEPS 316-324 are shown as independent from STEPS 300-306 in FIG. 12. The processes represented by these two sets of blocks are independent of one another as shown in FIG. 10. The independence of these two processes have been described above with regard to FIG. 10, and thus are not described again herein. The above-described method of FIG. 12 does not require matrix inversions, and thus the method can be efficiently implemented in hardware such as digital signal processors. The inventive method extracts a coarse estimate of the gradient of the inverse cost function and updates the weighting vector accordingly.

Approximation for a Weight Vector Interference Normalization

In one embodiment of the present inventive technique, an approximation for a weight vector interference normalization can be utilized to eliminate a division and a square root mathematical operation. Thus, hardware and software implementation of the technique can be simplified, resulting in improved performance and reduced costs. The approximation for a weight vector interference normalization relies upon the observation that for small perturbations, i.e. small $\beta$, the resulting gradient implementation is a linear operation on the gradient of the desired quantity (i.e., a first order Taylor approximation is valid). The approximation can be represented by the following equations:

Even equation: $\sqrt{\frac{w_{base}^H \hat{\Phi} w_{base}}{(w_{base} + \beta \cdot v)^H \hat{\Phi}(w_{base} + \beta \cdot v)}} \cong 1 - 2\beta \frac{\text{Re}(v^H \hat{\Phi} w_{base})}{w_{base}^H \hat{\Phi} w_{base}}$ Odd equation: $\sqrt{\frac{w_{base}^H \hat{\Phi} w_{base}}{(w_{base} - \beta \cdot v)^H \hat{\Phi}(w_{base} - \beta \cdot v)}} \cong 1 + 2\beta \frac{\text{Re}(v^H \hat{\Phi} w_{base})}{w_{base}^H \hat{\Phi} w_{base}}$ Thus, the approximation replaces one square root and two division operations with zero square root and one division operation.

Utilization of Parameter B

In the present inventive technique, the parameter B is an algorithm constant that ensures that the method tracks to a solution to Equation 2 because utilization of B ensures non-singularity in the denominator of the matrix of Equation 2. The larger values of B reduce the nulling effect because the contribution of the channel vectors $c_k$ in $\hat{\Phi}$ becomes smaller in the denominator of Equation 2. A large B tends to select the weights which minimize total transmission power, rather than total transmitted interference power. This is potentially beneficial in cases where some receivers may not be operating with this algorithm and hence cannot have nulls steered towards them. Accordingly, receivers do not receive excessive interference due to the interference power delivered to these receivers that evade tracking by the transmitter. For example, in a cellular communication system, some mobile receivers within a cell #A may not participate in the TxAA weighting of a cell #B. Thus, the inclusion of the parameter B aids in reducing the interference transmitted by the cell #B to the mobiles in the cell #A. In another example, some mobiles within a cell may have an antenna adaptation feedback loop enabled while others do not.

The weights do not null as the limit B→∞, but rather the power delivered to the receiver maximizes subject to a fixed total transmit power constraint. One of ordinary skill in the art shall recognize that other network parameters can be utilized to determine an approximate value for B without departing from the scope or spirit of the present invention.

Utilization of Adjustment Parameter $A_k$—QOS and Power Control

The present inventive technique can modify the adjustment parameter ($A_k$) for any receiver. The modification provides stronger or weaker nulling relative to the other receivers. For example, the present technique can increase the adjustment parameter ($A_k$) for receivers having a higher QOS, and thus providing stronger nulling for these receivers. The present inventive technique can utilize other parameters in determining whether to modify the adjustment parameter ($A_k$). For example, the operational data rate of a channel can be utilized for this purpose. In another example, power control is utilized to determine whether to modify the adjustment parameter ($A_k$).

In the power control parameter embodiment of the present inventive technique, the adjustment parameter is modified to correspond to the inverse of a mobile station transmit power. The present power control parameter embodiment is particularly useful in CDMA cellular systems that utilize forward link closed loop power control. The present embodiment relies upon the observation that information from a feedback channel from the MS receiver to the base station transmitter can provide information regarding a minimum allowable reception transmission power. This embodiment also relies upon the observation that the minimum allowable reception transmission power corresponds to receiver channel strength. Thus, higher values for the minimum allowable reception transmission power correspond to weaker channels, and thus less nulling is required because interference associated with the base station is attenuated.

One technique for modifying the adjustment parameter ($A_k$) is represented by the following equation:

$$A_k = C_k \left(\frac{1}{P_k^{(T)}}\right) + D_k$$

where $C_k$ is an algorithm constant that scales the contribution from the transmission power and $D_k$ is from the QOS considerations. D is defined as a parameter that is increased when a user requires better signal-to-noise ration (SNR) for a particular reason. For example, the reason may be a higher data rate or some form of service that requires lower error rates. In one exemplary implementation of the power control parameter embodiment, the adjustment parameter ($A_k$) is modified to equal zero for a plurality of receivers to steer nulls to more sensitive devices such as data transmission users (versus voice transmission users).

Soft Handoff Application of the Present Inventive Generating Transmit Adaptive Antenna Weighting with Nulling Using Binary Gradient Feedback Technique The present inventive generating transmit adaptive antenna weighting with nulling using binary gradient feedback technique can be utilized during soft handoffs in a CDMA communication system. As is well known, during a soft handoff a mobile station receives transmissions from multiple base stations. The present application applies the gradient weight update algorithm with a single bit that controls the weight vector selections of multiple base stations. The present soft handoff application technique is particularly well suited for antenna weight nulling in adjacent base stations.

Non-Tracked Transmission Application of the Present Invention

The non-tracked transmission application of the present invention allows weighting and nulling to operate even when a receiver is not transmitting (e.g., idle modes in a cellular system mobile station) and thus the receiver cannot provide feedback. The present application relies upon the observation that nulls can be steered to proximate receivers for which there is feedback (i.e. not all proximate receivers) through the use of adapted "common" weight vectors applied to the non-tracked signals. A common weight vector is defined as an antenna weight that is used for all receivers in a class of receivers. Steering the nulls of the common channel reduces interference to receivers that operate on a closed loop antenna update. In one embodiment, the present invention utilizes open loop space-time codes. Two techniques for utilizing open loop space-time codes are now described in more detail.

A first non-tracked transmission technique referred to as a false channel approximation technique selects an arbitrary set of orthogonal forward channels wherein the arbitrary set comprises one orthogonal forward channel for each space-time code transmission. In accordance with the false channel approximation (FCA) technique, each channel of the arbitrary set is modulated and the arbitrary channel is utilized as input to the Equation 3 to derive weights. The FCA technique defines the value of $\hat{\Phi}$ as it would normally be defined and excludes all "common" or non-tracked transmissions from this definition. The technique utilizes a constant, arbitrary vector as the "false channel estimate" for these non-tracked receivers. This constant, arbitrary vector is a single "false" channel estimate for all of these non-tracked receivers (even though each channel is actually independent). The FCA technique calculates the common weight vector applied to all non-tracked transmissions by plugging this false channel estimate into Equation 3. Thus, the "direction" in which the transmission is implemented tends to de-emphasize the directions of the tracked receivers. This de-emphasizing does not help the non-tracked receivers per se, however it tends to steer nulls of all of these non-tracked transmissions toward each of the tracked receivers, and thus greatly reducing (and in some cases minimizing) the interference to those receivers.

A second non-tracked transmission technique, referred to as a common channel transmission in minimal subspaces technique, attempts to reduce interference to mobile stations by transmitting the common channel transmissions in the channel subspaces. Examples of channel subspaces include nullspace and minimum response space. The common channel transmission in minimal subspaces technique relies upon the observation that steering the non-tracked transmissions into the eigenspaces of the matrix $\Phi$ corresponding to the smallest eigenvalues of $\Phi$ minimizes the interference to the tracked receivers. Thus, the present technique calculates eigenvectors and eigenvalues of the matrix $\hat{\Phi}$. These eigenvalues represent an amount of interference generated by transmission into an associated eigenspace. The weights are set to those eigenvectors which correspond to the smallest eigenvalues. Methods of calculating eigenvectors and eigenvalues are well known to those of ordinary skill in the communication art, and thus are not described in detail herein. Either of the two above-described non-tracked transmission techniques can be utilized with the present invention without departing from the scope or spirit of the present invention.

SUMMARY

The generating transmit adaptive antenna weights with nulling using binary gradient feedback method and apparatus of the present invention allows a communication system to provide adequate power to a desired receiver and reduce interference to proximate receivers. The method and apparatus of the present invention generates transmit adaptive antenna weights that direct (or "steer") nulling to proximate receivers, and thus reduce interference to these proximate receivers. The generating transmit adaptive antenna weights method and apparatus utilizes a feedback algorithm that tracks a normalized weight vector toward a maximum of an inverse cost function.

The method and apparatus of the present invention improves the performance and capacity of a CDMA system. Specifically, the present inventive method and apparatus decreases the overall interference in a communication system.

A number of embodiments of the present invention have been described. Nevertheless, it will be understood that various modifications may be made without departing from the spirit and scope of the invention. For example, the weight vector update can be performed by the TxAA algorithm or another feedback algorithm that tracks the weight vector to a solution of the inverse cost function.

Accordingly, it is to be understood that the invention is not to be limited by the specific illustrated embodiment, but only by the scope of the appended claims.

What is claimed is:

1. A method of generating weighted transmit signals with nulling in a communication system, wherein the communication system includes a transmitter and a plurality of receivers, and wherein the transmitter includes a plurality of antennae, the method comprising:
   a) initializing a parameter set and a weight vector for a target receiver;
   b) updating the weight vector based on an individually weighted inverse cost function, a value of which increases when power calculated as delivered to the target receiver increases and decreases when power calculated as delivered to non-target receivers increases, wherein calculation of the inverse cost function selectably weighs interference calculated as delivered to one non-target receiver differently from interference calculated as delivered to another non-target receiver;
c) updating the parameter set; and
d) returning to the act (b).

2. The method of generating weighted transmit signals with nulling as defined in claim 1, wherein the communication system comprises a DS-CDMA communication system.

3. The method of generating weighted transmit signals with nulling as defined in claim 1, wherein individual weighting modifies the general inverse cost function that is represented by the following equation:

$$\text{general inverse cost function} = \frac{\text{delivered power to a desired receiver}}{\text{interference power to all proximate receivers}}.$$

4. The method of generating weighted transmit signals with nulling as defined in claim 1, wherein the initialization act (a) comprises initializing the parameter set with an adjustment parameter selected for a particular non-target receiver according to a quality of service requirement.

5. The method of generating weighted transmit signals with nulling as defined in claim 1, wherein the updating the parameter set act (c) comprises updating an adjustment parameter selected for a particular non-target receiver according to a power control requirement.

6. The method of generating weighted transmit signals with nulling as defined in claim 1, wherein the updating the parameter set act (c) comprises updating the adjustment parameter according to the following equation wherein subscript k is an index for a particular receiver, A is a nulling depth parameter, $P^{(T)}$ reflects transmission power, C is an algorithm constant for scaling the effect of transmission power, and D is an algorithm constant based on quality of service considerations:

$$A_k = C_k \left( \frac{1}{P_k^{(T)}} \right) + D_k.$$

7. The method of generating weighted transmit signals with nulling as defined in claim 6, wherein $P_k^{(T)}$ is a transmission power for the $k^{th}$ receiver that is determined by closed loop power control in which the $k_{th}$ receiver transmits power control information to the transmitter.

8. The method of generating weighted transmit signals with nulling as defined in claim 1, wherein the parameter set includes a cochannel gain matrix, and updating the parameter set act (c) comprises updating the cochannel gain matrix $\Phi$ according to the following equation in which c is a channel vector, subscript k indicates a $k^{th}$ receiver, K total receivers are addressed by the method at a particular time, $A_k$ is an adjustment parameter adjusting relative effect of each receiver k, and B is an algorithm gain constant:

$$\hat{\Phi} = \sum_{k=0}^{K-1} A_k \hat{c}_k \hat{c}_k^H + B \cdot I.$$

9. The method of claim 1, further comprising transmitting a plurality of probe signals to the target receiver, wherein updating the weight vector is based on feedback from the target receiver indicating which of the plurality of probe signals is determined to have better received signal quality, rather than on feedback indicative of a channel estimate determined by the target receiver.

10. The method of claim 9, further comprising generating a perturbation vector, and generating at least a first of the probe signals by weighting a transmitted signal in accordance with a current weight vector modified as a function of the perturbation vector.

11. The method of claim 10, further comprising generating a second of the probe signals by weighting a transmitted signal in accordance with a current weight vector modified as a different function of the perturbation vector.

12. The method of claim 11, wherein the feedback indicating which of the plurality of probe signals is better indicates whether the first probe signal delivered higher or lower power to the target receiver than the second probe signal.

13. A method of generating weighted transmit signals with nulling in a communication system, wherein the communication system includes a transmitter and a plurality of receivers, and wherein the transmitter includes a plurality of antennae, the method comprising:
a) initializing a parameter set and a weight vector set;
b) updating the weight vector set based on an inverse cost function, a value of which increases when power calculated as delivered to a target receiver increases and decreases when power calculated as delivered to non-target receivers increases;
c) updating the parameter set; and
d) returning to the act (b), wherein the inverse cost function is represented by the following equation in which w is a weight vector and c is a channel vector, subscript m indicates a particular $m^{th}$ receiver while subscript k varies to reflect K total receivers addressed by the method at a particular time, $A_k$ is an adjustment parameter for adjusting nulling effect for each receiver k, and B is an algorithm gain constant:

$$J = \frac{|w_m^H(i) c_m(i)|^2}{\sum_{k=0}^{K-1} A_k \left| w_m^H(i) \frac{c_k(i)}{\|c_k(i)\|} \right|^2 + B};$$

where J=inverse cost function.

14. A method of generating weighted transmit signals with nulling in a communication system, wherein the communication system includes a transmitter and a plurality of receivers, and wherein the transmitter includes a plurality of antennae, the method comprising:
a) initializing a parameter set and a weight vector set;
b) updating the weight vector set based on an inverse cost function, a value of which increases when power calculated as delivered to a target receiver increases and decreases when power calculated as delivered to non-target receivers increases;
c) updating the parameter set; and
d) returning to the act (b), wherein the weight vector is represented by the following equation in which w is a weight vector and c is a channel vector, subscript m indicates a particular $m^{th}$ receiver while subscript k varies to reflect K total receivers addressed by the method at a particular time, $\Phi$ is a cochannel gain matrix, $A_k$ is an adjustment parameter for adjusting nulling effect for each receiver k, and B is an algorithm gain constant:

$$w_m = \arg\left(\max_{\substack{w_m \\ \|w_m\|=1}} \left(\frac{|w_m^H c_m c_m^H w_m|^2}{w_m^H \Phi w_m}\right)\right) \text{ where } \Phi = \sum_{k=0}^{K-1} A_k c_k c_k^H + B \cdot I.$$

15. A method of generating weighted transmit signals with nulling in a communication system, wherein the communication system includes a transmitter and a plurality of receivers, and wherein the transmitter includes a plurality of antennae, the method comprising:
 a) initializing a parameter set and a weight vector set;
 b) updating the weight vector set based on an inverse cost function, a value of which increases when power calculated as delivered to a target receiver increases and decreases when power calculated as delivered to non-target receivers increases;
 c) updating the parameter set; and
 d) returning to the act (b),
wherein the weight vector is represented by the following equation in which w is a weight vector and c is a channel vector, subscript k indicates a $k^{th}$ receiver, K total receivers are addressed by the method at a particular time, $\Phi$ is a cochannel gain matrix, $A_k$ is an adjustment parameter for adjusting nulling effect for each receiver k, and B is an algorithm gain constant:

$$w_k = \frac{\Phi^{-1} c_k}{\|\Phi^{-1} c_k\|}, \text{ where } \Phi = \sum_{k=0}^{K-1} A_k c_k c_k^H + B \cdot I.$$

16. The method of claim 15, further comprising transmitting a plurality of probe signals to the target receiver during alternating periods, including first and second probe signals that are signals for the target receiver as weighted by a current weight vector modified as a corresponding first or second function of a selected perturbation vector, wherein updating the weight vector is based on feedback from the target receiver indicating whether reception is better during time periods of the probe signal or time periods of the second probe signals, rather than on feedback indicative of a channel estimate determined by the target receiver.

17. A method of generating weighted transmit signals with nulling in a communication system, wherein the communication system includes a transmitter and a plurality of receivers, and wherein the transmitter includes a plurality of antennae, the method comprising:
 a) initializing a parameter set and a weight vector set;
 b) updating the weight vector set based on an inverse cost function, a value of which increases when power calculated as delivered to a target receiver increases and decreases when power calculated as delivered to non-target receivers increases;
 c) updating the parameter set; and
 d) returning to the act (b),
wherein the updating the weight vector act (b) comprises updating the weight vector according to the following equation in which w is a weight vector and c is a channel vector, subscript m indicates an $m^{th}$ receiver, and $\Phi$ is a cochannel gain matrix:

$$w_m \Leftarrow \frac{f(w_m, c, \hat{\Phi})}{\|f(w_m, c, \hat{\Phi})\|}.$$

18. The method of generating weighted transmit signals with nulling as defined in claim 17 wherein the update adjusts $w_m$ towards maximizing an inverse cost which is a function of $w_m$, c, and $\hat{\Phi}$.

19. The method of generating weighted transmit signals with nulling as defined in claim 18 wherein the maximized inverse cost is given by $$\frac{|w_m^H(i) c_m(i)|^2}{w_m^H(i) \hat{\Phi} w_m^H(i)}.$$

20. A method of generating vector weighted transmit signals with nulling in a communication system, wherein the communication system includes a transmitter and a plurality of receivers, and wherein the transmitter includes a plurality of antennae, the method comprising:
 a) initializing a weight vector for each receiver;
 b) initializing a set of adaptation parameters;
 c) generating, at the transmitter, a plurality of transmit probing signals for each particular receiver based on the weight vector and parameter set for the particular receiver and on channel estimates for each of a plurality of tracked receivers comprising a subset of the receivers of the system;
 d) obtaining, from each receiver, feedback that indicates which of the plurality of corresponding transmit probing signals generated in act (c) for each receiver was received better according to a measure of signal reception quality, rather than reporting channel state information;
 e) updating the weight vector employed by the transmitter for each particular receiver based on the feedback generated in act (d) for each receiver; and
 f) updating the parameter set by the transmitter based on the weight vector updated in act (e).

21. The method of generating weighted transmit signals with nulling as defined in claim 20, wherein the updating the weight vector act (e) comprises the following sub-acts:
 i) updating the weight vector periodically; and
 ii) updating the weight vector upon receiving binary feedback.

22. The method of generating weighted transmit signals with nulling as defined in claim 21, wherein the updating the weight vector upon receiving binary feedback sub-act (e)(ii) comprises the following sub-acts:
 A) receiving a feedback bit that constitutes the binary feedback;
 B) proceeding to a sub-act C) if the feedback bit indicates an even channel, else proceeding to a sub-act D);
 C) updating a base vector based on an even weight, and proceeding to sub-act E);
 D) updating the base vector based on an odd weight; and
 E) computing new values for the even weight, the odd weight and a data channel weight based on the base vector.

23. The method of generating weighted transmit signals with nulling as defined in claim 22, wherein the updating a base vector based on an even weight sub-act (e)(ii)(C) comprises updating according to the following equation wherein w is a weight vector, subscript base indicates the base vector value, and subscript even denotes a particular new selected vector value:

$$w_{base} \Leftarrow \frac{w_{even}}{\|w_{even}\|}.$$

24. The method of generating weighted transmit signals with nulling as defined in claim 23, wherein a weight vector interference normalization is approximated according to the following equations in which c is a channel vector, v is any perturbation vector, $\beta$ is a tracking gain constant, and $\Phi$ is a cochannel gain matrix:

$$\sqrt{\frac{w_{base}^H \hat{\Phi} w_{base}}{(w_{base} + \beta \cdot v)^H \hat{\Phi}(w_{base} + \beta \cdot v)}} \cong 1 - 2\beta \frac{\text{Re}(v^H \hat{\Phi} w_{base})}{w_{base}^H \hat{\Phi} w_{base}}; \quad \text{Even equation}$$

$$\sqrt{\frac{w_{base}^H \hat{\Phi} w_{base}}{(w_{base} + \beta \cdot v)^H \hat{\Phi}(w_{base} + \beta \cdot v)}} \cong 1 + 2\beta \frac{\text{Re}(v^H \hat{\Phi} w_{base})}{w_{base}^H \hat{\Phi} w_{base}}. \quad \text{Odd equation}$$

25. The method of generating weighted transmit signals with nulling as defined in claim 22, wherein the updating a base vector based on an odd weight sub-act (e)(ii)(D) comprises updating according to the following equation wherein w is a weight vector, subscript base indicates the base vector value, and subscript odd denotes a particular new selected vector value:

$$w_{base} \Leftarrow \frac{w_{odd}}{\|w_{odd}\|}.$$

26. The method of generating weighted transmit signals with nulling as defined in claim 22, wherein the computing new values sub-act (e)(ii)(E) comprises computing an even weight, an odd weight and a data channel weight according to the following equations in which w is a weight vector and c is a channel vector, v is any perturbation vector, $\beta$ is a tracking gain constant, $\Phi$ is a cochannel gain matrix, subscript base indicates a previous value, and subscripts even and odd denote values perturbed from a previous value:

$$w_{even} \Leftarrow (w_{base} + \beta \cdot v) \cdot \sqrt{\frac{w_{base}^H \hat{\Phi} w_{base}}{(w_{base} + \beta \cdot v)^H \hat{\Phi}(w_{base} + \beta \cdot v)}};$$

$$w_{odd} \Leftarrow (w_{base} - \beta \cdot v) \cdot \sqrt{\frac{w_{base}^H \hat{\Phi} w_{base}}{(w_{base} - \beta \cdot v)^H \hat{\Phi}(w_{base} - \beta \cdot v)}};$$

$$w \Leftarrow \frac{w_{even} + w_{odd}}{2}.$$

27. The method of generating weighted transmit signals with nulling as defined in claim 20 wherein the updating the parameter set act (f) comprises a normalized channel estimate parameter according to the following equation in which subscripts are receiver indices, c is a channel matrix, w is a weight vector, and $\Phi$ is a cochannel gain matrix:

$$\hat{c}_m = \frac{\hat{\Phi} w_m}{\|\hat{\Phi} w_m\|}.$$

28. The method of generating weighted transmit signals with nulling as defined in claim 20, wherein the updating the parameter act (e) comprises updating a cochannel gain matrix $\Phi$ according to the following equation in which c is a channel vector, subscript k indicates a $k^{th}$ receiver, K total receivers are addressed by the method at a particular time, A is an adjustment parameter adjusting relative effect of each receiver k, and B is an algorithm gain constant:

$$\hat{\Phi} \Leftarrow \sum_{k=0}^{K-1} A_k \hat{c}_k \hat{c}_k^H + B \cdot I.$$

29. The method of claim 20, wherein each receiver is a target receiver for signals intended for it, and a non-target receiver for signals intended for other receivers, and wherein the step (e) of updating the weight vector for each receiver further comprises adjusting the weight vector to decrease interference power radiated to non-target receivers by signals intended for the target receiver.

30. The method of claim 29, wherein the weight vector for each target receiver is adjusted to maximize a ratio of power calculated as delivered by an intended signal to the target receiver, divided by a quantity that reflects power calculated as delivered by the same signal to non-target receivers.

31. The method of claim 30, wherein the quantity that reflects power delivered to non-target receivers is weighted individually to more strongly reflect power delivered to one selected non-target receiver than power delivered to another selected non-target receiver.

32. The method of claim 31, wherein (c) generating the plurality of transmit probing signals further comprises generating a test perturbation vector and computing an even weight, an odd weight and a data channel weight according to the following equations in which w is a weight vector and c is a channel vector, v is the test perturbation vector, $\beta$ is a tracking gain constant, $\Phi$ is a cochannel gain matrix, subscript base indicates a previous value, and subscripts even and odd denote values perturbed from a previous value:

$$w_{even} \Leftarrow (w_{base} + \beta \cdot v) \cdot \sqrt{\frac{w_{base}^H \hat{\Phi} w_{base}}{(w_{base} + \beta \cdot v)^H \hat{\Phi}(w_{base} + \beta \cdot v)}};$$

$$w_{odd} \Leftarrow (w_{base} - \beta \cdot v) \cdot \sqrt{\frac{w_{base}^H \hat{\Phi} w_{base}}{(w_{base} - \beta \cdot v)^H \hat{\Phi}(w_{base} - \beta \cdot v)}};$$

$$w \Leftarrow \frac{w_{even} + w_{odd}}{2}.$$

33. A method of generating vector weighted transmit signals with nulling in a communication system, wherein the communication system includes a transmitter and a plurality of receivers, and wherein the transmitter includes a plurality of antennae, the method comprising:

a) initializing a weight vector for each receiver;

b) initializing a set of adaptation parameters;

c) generating a transmit probing signal for each particular receiver based on the weight vector and parameter set for the particular receiver and on channel estimates for each of a plurality of tracked receivers comprising a subset of the receivers of the system;

d) generating feedback based on reception of the corresponding transmit probing signal generated in act (c) for each receiver within the subset of tracked receivers;

e) updating the weight vector employed by the transmitter for each particular receiver based on the feedback generated in act (d) for each receiver; and f) updating the parameter set by the transmitter based on the weight vector updated in act (e), wherein the generating the transmit probing signal act (c) comprises the following sub-acts:

i) generating a test perturbation vector; and
ii) computing an even weight, an odd weight and a data channel weight based on the test perturbation vector generated in sub-act (c)(i).

34. The method of generating weighted transmit signals with nulling as defined in claim 33, wherein the generating sub-act (c)(i) comprises storing a current value of the test perturbation vector and generating a new current value of the test perturbation vector, v, according to the following equation in which E(x) is an expected average value of x:

$v \Leftarrow$ test perturbation vector, $E(v)=0$, $E(vv^H)=2I$.

35. The method of generating weighted transmit signals with nulling as defined in claim 34, wherein the updating the weight vector act (e) of claim 24 comprises computing an even weight, an odd weight and a data channel weight based on the stored test perturbation vector.

36. The method of generating weighted transmit signals with nulling as defined in claim 33, wherein the test perturbation vector is a Gaussian test perturbation vector.

37. The method of generating weighted transmit signals with nulling as defined in claim 33, wherein the computing act (c)(ii) comprises computing an even weight, an odd weight and a data channel weight according to the following equations in which w is a weight vector and c is a channel vector, v is any perturbation vector, $\beta$ is a tracking gain constant, $\Phi$ is a cochannel gain matrix, subscript base indicates a previous value, and subscripts even and odd denote values perturbed from a previous value:

$$w_{even} \Leftarrow (w_{base} + \beta \cdot v) \cdot \sqrt{\frac{w_{base}^H \hat{\Phi} w_{base}}{(w_{base} + \beta \cdot v)^H \hat{\Phi}(w_{base} + \beta \cdot v)}};$$

$$w_{odd} \Leftarrow (w_{base} - \beta \cdot v) \cdot \sqrt{\frac{w_{base}^H \hat{\Phi} w_{base}}{(w_{base} - \beta \cdot v)^H \hat{\Phi}(w_{base} - \beta \cdot v)}};$$

$$w \Leftarrow \frac{w_{even} + w_{odd}}{2}.$$

38. The method of generating weighted transmit signals with nulling as defined in claim 37, wherein a weight vector interference normalization is approximated according to the following equations:

$$\sqrt{\frac{w_{base}^H \hat{\Phi} w_{base}}{(w_{base} + \beta \cdot v)^H \hat{\Phi}(w_{base} + \beta \cdot v)}} \cong 1 - 2\beta \frac{\text{Re}(v^H \hat{\Phi} w_{base})}{w_{base}^H \hat{\Phi} w_{base}}; \quad \text{Even equation}$$

-continued $$\sqrt{\frac{w_{base}^H \hat{\Phi} w_{base}}{(w_{base} + \beta \cdot v)^H \hat{\Phi}(w_{base} + \beta \cdot v)}} \cong 1 + 2\beta \frac{\text{Re}(v^H \hat{\Phi} w_{base})}{w_{base}^H \hat{\Phi} w_{base}}. \quad \text{Odd equation}$$

39. The method of claim 37, wherein each particular receiver is a target receiver for signals intended for that receiver that are weighted in accordance with the weight vector corresponding to the target receiver, and a non-target receiver for signals intended for other receivers, and wherein the step (e) of updating the weight vector for each target receiver further comprises adjusting the weight vector to decrease interference power radiated to non-target receivers by signals intended for the target receiver.

40. The method of claim 39, wherein adjusting the weight vector to decrease interference power radiated to non-target receivers includes selectably varying the decrease of interference power to specific non-target receivers.

41. The method of generating weighted transmit signals with nulling as defined in claim 33, wherein the even and odd weight vectors are transmitted with multiplexing, where the even weight vector is applied with an even multiplex and the odd weight vector applied with an odd multiplex.

42. The method of generating weighted transmit signals with nulling as defined in claim 41, wherein the even and odd weight vectors are transmitted with time multiplexing, where the even weight vector is applied in even time slots and the odd weight vector is applied in odd time slots.

43. A method of generating weighted transmit signals with nulling in a communication system, wherein the communication system includes a transmitter in communication with a plurality of receivers, and wherein the transmitter includes a plurality of antennae, the method comprising:

a) initializing a plurality of baseband transmit weight vectors and a plurality of channel estimate vectors for multiple tracked transmissions;

b) updating the plurality of baseband transmit weight vectors based on previous channel estimates for the plurality of receivers and a metric of a cross interference that is selectable weighted differently for specific different ones of the plurality of receivers;

c) updating the plurality of channel estimates based on the plurality of baseband transmit weight vectors; and d) returning to act (b).

44. A communication system capable of generating weighted transmit signals with nulling, comprising:

a) a transmitter having a plurality of antenna elements and configured to transmit a targeted signal as weighted by elements of a weighting vector from a plurality of corresponding antenna elements, and further having computing elements that include i) an initializing module configured to initialize a parameter set and a weight vector associated with a particular receiver that is a target of the targeted signals, and ii) an inverse cost function calculation module configured to calculate an individually weighted inverse cost function, a value of which increases when power calculated as delivered to a target receiver increases and decreases when power calculated as delivered to non-target receivers increases, the calculation weighting interference calculated as delivered to one non-target receiver according to a first weighting value, and weighting interference calculated as delivered to a different second non-target receiver according to a selectable different second weighting value, and iii) a weight vector updating module configured to update the weight vector based on a value of the inverse cost function determined by the module ii).

45. The system of claim 44, wherein
the transmitter (a) further includes
  (iv) a probe signal generation module configured to generate a plurality of differently weighted probe signals to be received by the target receiver;
the weight vector updating module (a)(ii) is further configured to change weight vectors based in part on feedback from the target receiver indicating which of the plurality of probing signals was received with higher quality; and
the system further comprises
(b) a receiver that includes
  (i) a probe signal quality measurement module configured to measure a selected signal quality parameter for each of the plurality of received probe signals, and
  (ii) a probe signal feedback module configured to prepare feedback information indicating which of the plurality of received probe signals has higher quality, according to the quality parameter measurement, for transmission to the transmitter.

46. A transmitter, capable of generating weighted transmit signals with nulling, comprising:
  a) an initializer, adapted to initialize a parameter set and a weight vector for modifying, for each of a plurality of transmit antenna elements, a targeted signal transmitted to a target receiver by the transmitter;
  b) a first update device, responsive to the initializer, adapted to update the weight vector based on an inverse cost function, a value of which increases when power calculated as delivered to the target receiver increases and decreases by an amount that reflects, with a first sensitivity controlled by a first weighting value, interference power calculated as delivered by the targeted signal to a first non-target receiver, and reflects, with a second sensitivity controlled by a selectably different second weighting value, interference power calculated as delivered by the targeted signal to a different second non-target receiver; and
  c) a second update device adapted to update the parameter set in response to weight vector updates.

47. An apparatus for generating weighted transmit signals with nulling in a communication system, wherein the communication system includes a transmitter and a receiver, and wherein the transmitter includes a plurality of antennae, comprising:
  a) means for initializing a parameter set and a weight vector associated with a target receiver for the transmitter;
  b) means for updating the weight vector based on an individually weighted inverse cost function, a value of which increases when power calculated as delivered to the target receiver increases and decreases when power calculated as delivered to non-target receivers, increases by an amount that reflects the calculated power delivered to each non-target receiver as adjusted by a weighting that is selectable different for different non-target receivers; and
  c) means, responsive to the updating the weight vector means, for updating the parameter set.

48. An apparatus for generating weighted transmit signals with nulling in a communication system, wherein the communication system includes a transmitter and a receiver, and wherein the transmitter includes a plurality of antennae, comprising:
  a) means for initializing a plurality of baseband transmit weight vectors and a plurality of channel estimate vectors for multiple tracked transmissions;
  b) means for updating the plurality of baseband transmit weight vectors based on a metric of a cross interference that is individually weighted such that sensitivity to interference delivered to specific ones of the multiple tracked transmissions is selectably different for different tracked receivers, and on a plurality of current channel estimates for the tracked transmissions; and
  c) means, responsive to the updating the weight vector means, for updating the plurality of channel estimates based on the plurality of baseband transmit weight vectors.

\* \* \* \* \*

UNITED STATES PATENT AND TRADEMARK OFFICE
CERTIFICATE OF CORRECTION

PATENT NO. : 7,433,416 B1  
APPLICATION NO. : 10/080751  
DATED : October 7, 2008  
INVENTOR(S) : Brian Banister Page 1 of 1

It is certified that error appears in the above-identified patent and that said Letters Patent is hereby corrected as shown below:

Claim 24, Column 29, line 24, "base +", in both instances, should read --base - --.

Claim 43, Column 32, line 42, "selectable" should read --selectably--.

Signed and Sealed this

Thirty-first Day of March, 2009

JOHN DOLL  
*Acting Director of the United States Patent and Trademark Office*